US008053566B2

(12) United States Patent
Belanger et al.

(10) Patent No.: US 8,053,566 B2
(45) Date of Patent: Nov. 8, 2011

(54) METHODS FOR ISOLATING AND HARVESTING LIGNIN AND ISOLATED LIGNIN PREPARATIONS PRODUCED USING THE METHODS

(75) Inventors: Helene Belanger, Auckland (NZ); Ross L. Prestidge, Auckland (NZ); Tony James Lough, Auckland (NZ); James D. Watson, Auckland (NZ)

(73) Assignee: Vertichem Corporation, Toronto, Ontario (CA)

( * ) Notice: Subject to any disclaimer, the term of this patent is extended or adjusted under 35 U.S.C. 154(b) by 0 days.

(21) Appl. No.: 12/203,057

(22) Filed: Sep. 2, 2008

(65) Prior Publication Data

US 2009/0069550 A1   Mar. 12, 2009

Related U.S. Application Data

(60) Provisional application No. 60/969,452, filed on Aug. 31, 2007, provisional application No. 61/083,839, filed on Jul. 25, 2008.

(51) Int. Cl.
*C08H 7/00* (2006.01)
*C08L 97/00* (2006.01)

(52) U.S. Cl. ..................................................... 530/507

(58) Field of Classification Search .................... 530/507
See application file for complete search history.

(56) References Cited

U.S. PATENT DOCUMENTS

| | | | |
|---|---|---|---|
| 3,585,104 A | 6/1971 | Kleinert | |
| 4,100,016 A | 7/1978 | Diebold et al. | |
| 4,409,032 A | 10/1983 | Paszner et al. | |
| 4,470,851 A | 9/1984 | Paszner et al. | |
| 4,764,596 A | 8/1988 | Lora et al. | |
| 5,010,156 A | 4/1991 | Cook et al. | |
| 5,196,460 A | 3/1993 | Lora et al. | |
| 5,372,939 A | 12/1994 | Lastick et al. | |
| 5,680,995 A | 10/1997 | Salminen | |
| 5,681,427 A | 10/1997 | Lora et al. | |
| 5,705,216 A | 1/1998 | Tyson | |
| 5,788,812 A * | 8/1998 | Agar et al. | 162/16 |
| 5,865,948 A | 2/1999 | Lora et al. | |
| 5,879,463 A | 3/1999 | Hilst | |
| 6,409,841 B1 | 6/2002 | Lombard | |
| 6,660,506 B2 | 12/2003 | Nguyen et al. | |
| 6,763,947 B1 * | 7/2004 | Brooks | 209/170 |
| 7,109,005 B2 | 9/2006 | Eroma et al. | |
| 7,189,306 B2 | 3/2007 | Gervais | |
| 7,465,791 B1 | 12/2008 | Hallberg et al. | |
| 2002/0069987 A1 | 6/2002 | Pye | |
| 2008/0029233 A1 | 2/2008 | Wingerson et al. | |
| 2008/0032344 A1 | 2/2008 | Fallavollita | |
| 2008/0295980 A1 | 12/2008 | Hallberg et al. | |
| 2008/0299628 A1 | 12/2008 | Hallberg et al. | |

FOREIGN PATENT DOCUMENTS

| | | | |
|---|---|---|---|
| AU | 779714 | * | 2/2001 |
| AU | 779714 B2 | | 2/2001 |
| WO | 8403304 | | 8/1984 |
| WO | 9213849 | | 8/1992 |
| WO | 9641052 | | 12/1996 |
| WO | 0210073 A1 | | 2/2002 |
| WO | WO 02/10073 | | 2/2002 |
| WO | 2007051269 A1 | | 5/2007 |
| WO | 2007129221 A2 | | 11/2007 |
| WO | 2008/144903 | * | 12/2008 |
| WO | 2008144878 A1 | | 12/2008 |
| WO | WO 2008/144878 | | 12/2008 |
| WO | 2009003292 A1 | | 1/2009 |

OTHER PUBLICATIONS

Aristidou, Aritos, et al., "Metabolic engineering applications to renewable resource utilization," Current Opinions Biotechnology, vol. 11, pp. 187-198 (2000).
Bakker, R.R., et al., "Biofuel production from acid-impregnated willow and switchgrass," 2nd World Conference on Biomass for Energy Industry and Climate Protection, pp. 1467-1470, Rome Italy (May 10-14, 2004).
Balakshin, Mikhail Yu, et al., "Elucidation of the Structures of Residual and Dissolved Pine Kraft Lignins Using an HMQC NMR Technique," J. Agric. Food Chem., vol. 51, pp. 6166-6127 (2003).
Berlin, Alex et al., "Inhibition of Cellulase, Xylanase and B-glucosidase Activities by Softwood Lignin Preparations," Journal of Biotechnology, vol. 125, pp. 198-209 (2006).
Blokhina, Olga et al., Antioxidants, Oxidative Damage and Oxygen Deprivation Stress: A Review; Annals of Botany, vol. 91, pp. 179-194 (2003), Helsinki University, Finland.
Boussaid, Abdel, et al., "Fermentability of the Hemicellulose-Derived Sugars from Steam-Exploded Softwood (Douglas Fir)," Biotechnology and Bioengineering, vol. 64, No. 3, pp. 284-289 (Aug. 5, 1998).
Brownell, Harold H. et al., "Steam pre-treatment of lignocellulosic material for enhanced enzymatic hydrolyssis" Biotechnology and Bioengineering, vol. 29, pp. 228-235 (Feb. 1987).

(Continued)

*Primary Examiner* — Ling Choi
*Assistant Examiner* — Sonya Wright
(74) *Attorney, Agent, or Firm* — Ann W. Speckman; Janet Sleath; Speckman Law Group PLLC

(57) ABSTRACT

Lignin polymers having distinctive properties, including a generally high molecular weight and generally homogeneous size distribution, as well as preservation of native reactive side groups, are isolated by solvent extraction of plant materials. Methods for isolation of lignin polymers, and for use of the isolated lignin polymers are disclosed. Compositions containing lignin isolated from plant materials, such as carbon fiber composites, resins, adhesive binders and coatings, polyurethane-based foams, rubbers and elastomers, plastics, films, paints, nutritional supplements, food and beverage additives are disclosed. Xylose and xylose derivatives, furfural, fermentable sugars, cellulose and hemi-cellulose products may be used directly or further processed. The lignin polymers and other plant-derived products disclosed herein may be produced in abundance at low cost, and may be used as substitutes for feedstocks originating from fossil fuel or petrochemical sources in the manufacture of various products.

20 Claims, 7 Drawing Sheets

OTHER PUBLICATIONS

Capanema, Ewellyn A. et al., "Quantitative Characterization of a Hardwood Milled Wood Lignin by Nuclear Magnetic Resonance Spectroscopy," J. Agric. Food Chem., vol. 53, pp. 9639-9649 (2005).

Capanema, Ewellyn A. et al., "Structural Analysis of Residual and Technical Lignins by 1H-13C Correlation 2D NMR-Spectroscopy," Holzforschung vol. 55, pp. 302-308 (2001).

Chum, H.L. et al., "Organosolv Pretreatment for Enzymatic Hydrolysis of Poplars: I Enzyme Hydrolysis of Cellulosic Residues," Biotechnology and Bioengineering, vol. 31, pp. 643-649 (May 1988).

Funaoka, M. et al., "Conversion of Native Lignin to a Highly Phenolic Functional Polymer and Its Separation From Lignocellulosics," Biotechnology and Bioengineering, vol. 46, No. 6, pp. 545-552 (Jun. 20, 1995).

Garrote, G. et al., "Non-isothermal autohydrolysis of Eucalyptus wood," Wood Scient and Technology, vol. 36, pp. 111-123 (2002).

Holtzapple, Mark T. et al., "The effect of ogranosolv pretreatment on the enzymatic hydrolysis of poplar," Biotechnology and Bioengineering, vol. 26, pp. 670-676 (Jul. 1984).

Kim, S. et al., "Effect of structural features on enzyme digestibility of corn stover." Bioresource Technololgy, vol. 97(4) pp. 583-591 (2006).

Kim, Tai Hyun et al., "Fractionation of corn stover by hot-water and aqueos ammonia treatment," Bioresource Technology vol. 97, pp. 224-232 (2006).

Klinke, H.B. et al., "Inhibition of ethanol-producing yeast and bacteria by degradation products produced during pre-treatment of biomass." Appl. Microbiol. Biotechnol. vol. 66, pp. 10-26 (2004).

Kubo, Satoshi et al., "Poly (Ethylene Oxide)/Organosolv Lignin Blends: Relationship between Thermal Properties, Chemical Structure, and Blend Behavior," Macromolecules vol. 37, No. 18, pp. 6904-6911 (Jul. 31, 2004).

Li, Jiebing et al., "Carbohydrate reactions during high-temperature steam treatment of aspen wood," Applied Biochemistry and Biotechnology, vol. 125, pp. 175-188 (Feb. 4, 2005).

Lin, Yan et al., "Ethanol fermentation from biomass resources: current state and prospects," Appl. Microbiol. Biotechnol. vol. 69, pp. 627-642 (2006).

Liu, Chaogang et al., "Partial flow of compressed-hot water through corn stover to enhance hemicellulose sugar recovery and enzymatic digestibility of cellulose," Bioresource Technololgy, vol. 96, pp. 1978-1985 (Feb. 2006).

Lora, Jairo H. et al., "Recent Industrial Applications of Lignin: A Sustainable Alternative to Nonrenewable Materials." Journal of Polymers and the Environment, vol. 10, Nos. 1-2, pp. 39-47 (Apr. 2002).

McFarlane, Al et al., "Pretreatment of Willow Using Ethanol Solutions for Lignin Extraction," Department of Chemicals and Materials Engineering, School of Engineering, University of Auckland and AgriGenesis Biosciences Limited, Auckland, New Zealand, 7 pages.

McFarlane, Al L. et al., "Ethanol-water pulping: Estimation of activation energy using recycle reactor," Department of Chemicals and Materials Engineering, School of Engineering, University of Auckland, Auckland, New Zealand, 17 pages.

Mosier, Nathan et al., "Features of promising technologies for pretreatment of lignocellulosic biomass," Bioresource Technology, vol. 96, pp. 673-686 (2005).

Nagle, Nicholas J. et al., "Efficacy of a hot washing process for pretreated yellow poplar to enhance bioethanol production," Biotechnol. Prog., vol. 18, No. 4, pp. 734-738 (May 6, 2002).

Pan, Xuejun et al., "Biorefining of softwoods using ethanol organosolv pulping: preliminary evaluation of process streams for manufacture of fuel-grade ethanol andco-products," Biotechnology and Bioengineering, vol. 90, No. 4, pp. 473-481 (May 20, 2005).

Peng, CLaudio A.,"Biorefining: Back to the Future," Innovation vol. 6, No. 4, pp. 12-15 (Mar. 2002).

Rughani, Jagdish et al., "Combined Rapid-Steam Hydrolysis and Organosolv Pretreatment of Mixed Southern Hardwoods," Biotechnolology and Bioengineering, vol. 33, pp. 681-686 (Feb. 1989).

Sassner, Per et al., "Steam pretreatment of Salix with and without SO2 impregnation for production of bioethanol," Applied Biochemistry and Biotechnology, vol. 121-124, pp. 1101-1117 (2005).

UNEP Working Group on Cleaner Production in Pulp and Paper Industries, The ALCELL Process for Eliminating Sulfur from Pulping: Manufacture of Paper and Paper Products #16, Case Study,Technical Research Center of Finland, SF-02051 Espoo, Finland, http://www.p2pays.org/ref/10/09315.htm (1992).

Vanderlaan, M.N. et al., "Polyurethanes from ALCELL Lignin Fractions Obtained by Sequential Solvent Extraction," Biomass and Bioenergy, vol. 14, Nos. 5/6, pp. 525-531 (1998).

Wyman, Charles E. et al., "Comparative sugar recovery data from laboratory scale application of leading pretreatment technologies to corn stover," Bioresource and Technology, vol. 96, pp. 2026-2032 (Feb. 25, 2005).

Wyman Charles E. et al., "Coordinated development of leading biomass pretreatment technologies," Bioresource and Technology, vol. 96, pp. 1959-1966 (Feb. 26, 2005).

Yang, Bin et al., "Effect of Xylan and Lignin Removal by Batch and Flowthrough Pretreatment on the Enzymatic Digestibility of Corn Stover Cellulos.," Bioresource and Technology, vol. 86, No. 1, pp. 88-95 (Apr. 15, 2004).

Heindel, T.J. et al., "IPST Technical Paper Series Number 857," Institute of Paper Science and Technology, Atlanta Georgia (May 2000).

Aldrich Handbook of Fine Chemicals and Laboratory Equipment, (Sigma-Aldrich), pp. 1124-1125; (2003-2004) Australia-New Zealand.

PCT/NZ2007/000106 International Search Report; Australian Patent Office, 6 pages; (Sep. 9, 2007).

PCT/NZ2007/000106 Written Opinion; Australian Patent Office, 6 pages; (Sep. 9, 2007).

Belanger, Helene et al.; Amendment and Reply Accompanying Request for Continued Examination in response to the Office Action mailed Mar. 17, 2010; U.S. Appl. No. 12/203,047, filed Sep. 2, 2008, 13 pp. (submitted Jul. 15, 2010).

Capanema et al., (2001) Structural Analysis of Residual and Technical Lignins by 1H-13C Correlation 2D NMR-Spectroscopy. Holzforschung 55: 302-308.

Balakshin, et al. (2003) Elucidation of the Structures of Residual and Dissolved Pine Kraft Lignins Using an HMQC NMR Technique. J. Agric, Food Chem. 51(21): 6116-6127.

Capanema et al. (2005) Quantitative Characterization of a Hardwood Milled Wood Lignin by Nuclear Magnetic Resonance Spectroscopy. J. Agric. Food Chem. 53(25): 9639-9649.

Berlin et al. (Feb. 2006) Inhibition of Cellulase, Xylanase and B-glucosidase Activities by Softwood Lignin Preparations. J. Biotechnol. 125: 198-209.

Heindel et al. (2000) Theo of Dispersed Air Flotation. IPST Technical Paper Series No. 857.

* cited by examiner

METHODS FOR ISOLATING AND HARVESTING LIGNIN AND ISOLATED LIGNIN PREPARATIONS PRODUCED USING THE METHODS

CROSS-REFERENCE TO RELATED APPLICATIONS

This application claims priority to U.S. Provisional Patent Applications 60/969,452 filed Aug. 31, 2007 and 61/083,839 filed Jul. 25, 2008 and PCT International Application PCT/NZ08/00225 filed Sep. 1, 2008.

FIELD OF THE INVENTION

The present invention relates to lignin and other products, such as xylose, xylitol, furfural, fermentable sugars, cellulose and hemi-cellulose products isolated from plant materials, methods for isolating such products from plant materials, and compositions containing such plant-derived products.

BACKGROUND

Mounting global energy demands have dramatically increased the cost of fossil-fuel-based energy sources and petrochemicals. And, the environment has been harmed, perhaps irreparably, in an effort to meet this demand by discovery and extraction of fossil-fuel feedstocks, and by processing of those raw feedstocks to produce ever increasing amounts of fuel, petrochemicals, and the like. Petrochemicals furthermore provide the majority of raw materials used in many plastics and chemical industries. The present invention is directed to providing isolated, plant-derived, renewable and sustainable compositions that have multiple utilities and that provide renewable and sustainable substitutes for fossil-fuel derived and petrochemical feedstocks.

Lignin is a complex, high molecular weight polymer that occurs naturally in plant materials, and is one of the most abundant renewable raw materials available on earth. Lignin is present in all vascular plants and constitutes from about a quarter to a third of the dry mass of wood. It is covalently linked to hemicellulose in plant cell walls, thereby crosslinking a variety of plant polysaccharides. Lignin is characterized by relatively high strength, rigidity, impact strength and high resistance to ultra-violet light and, in wood, has a high degree of heterogeneity, lacking a defined primary structure.

Lignin molecules are generally large, cross-linked macromolecules and may have molecular masses in excess of 10,000 in their native form in plant material. The degree of lignin polymerization in nature is difficult to determine, since lignin is fragmented during extraction. Various types of lignin have been characterized and described, with the lignin properties generally depending on the extraction methodology. There are three monolignol monomers, which are methoxylated to various degrees: p-coumaryl alcohol, coniferyl alcohol, and synapyl alcohol. These monomers are incorporated in lignin polymers in the form of phenylpropanoids p-hydroxyphenyl (H), guaiacyl (G), and syringyl (S). Different plants exhibit different proportions of the phenylpropanoids.

The polyphenolic nature of lignin and its low toxicity, together with many additional properties (such as its dispersing, binding, complexing and emulsifying, thermal stability, specific UV-absorbing, water repellent and conductivity characteristics), make it an attractive renewable replacement for toxic and expensive fossil fuel-derived polymer feedstocks. Unlike synthetic polymers, lignin is biodegradable in nature. In spite of its biodegradability, lignin is known to be one of the most durable biopolymers available.

Large quantities of lignin are produced as a by-product of the pulp and paper industry. Despite its unique and desirable characteristics as a natural product with multiple beneficial chemical, physical and biological properties, and its abundance, lignin isolated from plant materials remains largely under-exploited. The heterogeneity and low reactivity of lignin recovered from waste effluent produced by the pulp and paper industry has resulted in limited industrial utilization of this highly abundant and renewable natural product.

Lignin is recovered from sulfite or Kraft wood pulping processes as lignosulfonates containing significant amounts of contaminants. The recovered lignin molecules lack stereoregularity, with repeating units being heterogeneous and complex. In general, lignin obtained as a by-product of the Kraft process (referred to as Kraft lignin) requires further processing and/or modification, as described in U.S. Pat. Nos. 5,866,642 and 5,202,403, in order to increase its reactivity and to allow its use in the formation of higher value products. Kraft lignin preparations contain a mixture of lignin sulfonate and degraded lignin, together with numerous decomposition products, such as sugars, free sulfurous acid and sulfates. The phenolic structures of the Kraft lignin are highly modified and condensed. The sulfite process for wood treatment produces a water soluble sulfonated lignin preparation that contains a high content of sugars, sugar acids and sugar degradation products, as well as resinous extractives and organic constituents with multiple coordination sites. The costs associated with the purification and functionalization required to make these low grade lignin preparations useful have limited their utilization in high value application markets.

The use of organic solvents for lignin extraction prior to carbohydrate hydrolysis as disclosed, for example, in U.S. Pat. Nos. 4,764,596, 5,788,812 and 5,010,156, was shown to improve the quality of the resulting lignin, but the use of a catalyst in combination with various types of solvents under severe conditions often produced lignin having altered reactivity (McDonough (1992) *TAPPI Solvent Pulping Seminar*, Boston, Mass., The Institute of Paper Science and Technology; Pan and Sano (2000) *Holzforschung* 54:61-65; Oliet et al. (2001) *J. Wood Chem. Technol.* 21:81-95; Xu et al. (2006) *Industrial Crops and Products* 23:180-193).

The reactivity of lignin depends mainly on the presence and frequency of aliphatic, phenolic hydroxyl and carbonyl groups, which varies depending on the lignin source and the extraction process used to obtain the lignin. The average molecular weight and polydispersity of lignin in the preparation also has a great impact on its reactivity.

As demonstrated in the many attempts to replace phenol with lignin in the formation of phenol-based resins, the low reactivity of the lignin means that only a small amount of phenol can be displaced without affecting the mechanical and physical properties of the final resin (Çetin and Özmen (2002) *Int. J. Adhesion and Adhesives* 22:477-480; Çetin and Özmen (2003) *Turk. J. Agric. For.* 27:183-189; Sellers et al. (2004) *For. Prod. J.* 54:45-51). Similar difficulties are encountered when lignin is employed in other types of applications. For example, the thermostability of lignin used to produce carbon fibers by spinning, as described in U.S. Pat. No. 6,765,028, and the carbonization of the resulting lignin fibers, are largely influenced by the method of lignin extraction and the origin and composition of the lignin (Kadla et al. (2002) *Carbon* 40:2913-2920).

When acidic ethanol-extracted lignin was used as a polyol for the experimental preparation of polyurethane (PU), replacement of 35% to 50% of the PU resin was achieved without compromising the integrity of the lignin-based PU film (Vanderlaan and Thring (1998) *Biomass and Bioenergy* 14:525-531; Ni and Thring (2003) *Int. J. Polymeric Materials* 52:685-707). Smaller ratios of replacement of PU resin (<10%) have been achieved by direct blending of soda lignin in pre-formed PU resin (Ciobanu et al. (2004) *Industrial Crops and Products* 20:231-241).

Polymer blending is also a convenient method to develop lignin based products with desirable properties. (See, e.g., Kubo and Kadla (2003) *Biomacromolecules* 4(3):561-567; Feldman et al. (2003) *J. Appl. Polym. Sci.* 89:2000-2010; Alexy et al. (2004) *J. Appl. Polym. Sci.* 94:1855-1860; Banu et al. (2006) *J. Appl. Polym. Sci.* 101:2732-2748) The efficiency and quality of the polymer blend is normally closely related to the chemical and physical properties of the lignin preparation, such as monomer type(s), molecular weight and distribution, which depends on the origin of the lignin and method used for its extraction, isolation and harvesting.

Upgrading lignin through chemical functionalization has been shown to be a good strategy for the successful incorporation of plant-derived lignins in high value products. However, these reactions are costly when low grade or low reactivity lignin is used as the substrate for chemical modification. Large amounts of reactants are required, together with longer reaction times and higher temperatures, to achieve relatively low rates of transformation of low grade and low reactivity lignins. This adds to the cost of the lignin feedstock and reduces its desirability for use in various types of industrial processes.

SUMMARY OF THE INVENTION

In one aspect, the present invention provides isolated, high grade lignin polymers derived from plant materials, as well as methods for isolating lignin from plant materials, compositions comprising the high grade lignin polymers and methods for using such lignin polymers in high value products. The disclosed lignin is more suitable for use as a feedstock for making downstream products than lignin extracted from plant materials using alternative methods, such as acid or alkaline extraction or steam explosion techniques, and has distinct properties compared to lignin polymers isolated from plant materials using alternative techniques.

The plant material employed in the disclosed methods for producing a high grade isolated lignin product is preferably a lignocellulosic plant material selected from the group consisting of: woody or herbaceous materials, agricultural and/or forestry plant materials and residues, and dedicated energy crops. In some embodiments, the plant material comprises a hardwood material, and in some embodiments the plant material comprises a coppicable hardwood material, such as a coppicable shrub. In certain embodiments, the plant material employed comprises a material selected from a group consisting of *Salix* (e.g., *Salix schwerinii, Salix viminalis*), Poplar, *Eucalyptus*, Mesquite, Jatropha, Pine, switch grass, miscanthus, sugar cane bagasse, soybean stover, corn stover, rice straw and husks, cotton husks, barley straw, wheat straw, corn fiberwood fiber, oil palm (e.g., *Elaeis guineensis, Eiaeis oleifera*) frond, trunk, empty fruit-bunch, kernels, fruit fibers, shell and residues of oil palm materials, and combinations thereof. Additional plant materials may be used. The present invention contemplates isolated lignin and other extraction products derived from any of these materials, and downstream products comprising lignin and other extraction products derived from any of these materials.

In some embodiments, plant materials comprising a higher proportion of syringyl (S)-lignin compared to guaiacyl (G)-lignin are preferred for processing to recover high grade isolated lignin. Plant materials having a S:G lignin ratio of at least 1:1 are preferred for some applications; plant materials having a S:G lignin ratio of at least 2:1 are preferred for some applications; and plant materials having a S:G lignin ratio of at least 3:1 or about 4:1 are preferred for some applications. The present invention comprehends isolated lignin and other extraction products derived from such plant materials, as well as compositions comprising isolated lignin and other extraction products derived from such plant materials.

In one aspect, high grade lignin and other extraction products may be isolated as a product of a solvent extraction process for treating plant materials such as the process disclosed in U.S. patent application Ser. No. 11/745,993, filed May 8, 2007 and published Nov. 8, 2007 as US 2007/0259412 A1, the disclosure of which is hereby incorporated by reference in its entirety. In this aspect, lignin is isolated from a plant material in a modified ORGANOSOLV™ (aqueous ethanol solvent) extraction process that involves contacting the plant material with a solution comprising up to about 70% ethanol in water at a temperature of approximately 170° C. to 210° C. and a pressure of from about 19-30 barg for a retention time sufficient to produce a "black liquor" solution containing lignin soluble in the aqueous ethanol solvent. In another aspect, lignin may be isolated from a plant material in a modified ORGANOSOLV™ (aqueous ethanol solvent) extraction process that involves contacting the plant material with a solution comprising up to about 80% ethanol in water, in some circumstances using a solution comprising from about 60% to about 80% ethanol in water, under conditions similar to those described above.

The modified ORGANOSOLV™ extraction is preferably carried out substantially in the absence of an introduced acid catalyst. For example, the reaction mixture may contain less than 1% of an introduced acid catalyst and, according to some embodiments, the reaction mixture contains less than 0.5% of an introduced acid catalyst. In some embodiments, the modified ORGANOSOLV™ extraction process is carried out in the absence of an introduced acid catalyst.

The black liquor produced using a modified ORGANOSOLV™ extraction process as described above may be flash evaporated to remove some of the solvent, and additional solvent may be steam-stripped from the liquor. The lignin may then be precipitated, separated by filtration and/or centrifugation, and dried. As a consequence of the mild nature of the modified ORGANOSOLV™ extraction process (treatment with aqueous ethanol solvent in the substantial absence of a biocatalyst), the extracted lignin is minimally modified from its native form and contains fewer contaminants (e.g., salts, sugars and/or degradation products) than lignins produced using Kraft or sulfite processes. The lignin produced by the modified ORGANOSOLV™ extraction process thus offers much greater potential as a bio-based feedstock material for use in a variety of processes and syntheses than lignin produced during paper pulp production or from other biomass fractionation processes using catalysts and more severe extraction conditions.

High grade lignin of the present invention may thus be isolated from a plant material in a modified ORGANOSOLV™ extraction process that involves contacting the plant material with a solvent comprising up to 80% ethanol in water, in some embodiments from about 60% to 80% ethanol in water and, in some embodiments, about 70% ethanol in water. The temperature of the materials undergoing the modified ORGANOSOLV™ extraction process may be approximately 170° C. to 210° C., in some embodiments approximately 180° to 200° C., and in yet other embodiments approximately 185° to 195° C. The pressure in the reaction chamber during modified ORGANOSOLV™ processing is generally from about 19-30 barg. For any given solvent composition, desired temperatures during modified ORGANOSOLV™ processing produce pressures that substantially prevent the solvent from boiling.

According to some embodiments, the solvent extraction is carried out on a substantially continuous processing basis, in a reaction vessel that provides co-current or countercurrent flow of solvent and biomass feedstock. The modified ORGANOSOLV™ process, as described herein, particularly employing continuous processing, reduces the re-condensation and re-deposition of lignin often seen in batch reactors by allowing removal of solvent at temperatures well above the normal boiling point of the solvent. Alternatively, the solvent extraction may be carried out as a batch reaction or, according to some embodiments, as a batch reaction repeated two or more times. The solids:liquid ratio during solvent extraction is preferably at least 1:1 and, in some embodiments may be at least 1:2, in some embodiments at least 1:3; and in yet additional embodiments up to about 1:4.

Residence time of the plant material in the reaction chamber, or solvent extraction digester, is generally at least about 20 minutes and may be from about 20 to 80 minutes. In alternative embodiments, the residence time may be from about 30 to 70 minutes or, in yet other embodiments, from about 40 to 60 minutes. A residence time in the solvent extraction digester sufficient to produce a "black liquor" solution containing lignin soluble in the aqueous ethanol solvent is suitable. The modified ORGANOSOLV™ extraction is preferably carried out substantially in the absence of an acid or alkaline catalyst. For example, the reaction mixture may contain less than 1% of an introduced acid or alkaline catalyst and, according to some embodiments, the reaction mixture contains no introduced acid or alkaline catalyst.

In certain embodiments, the modified ORGANOSOLV™ extraction is carried out at a pH (measured with a glass electrode at room temperature) in the range of from about 3 to 9.5. In yet other embodiments, the modified ORGANOSOLV™ extraction is carried out at a pH of more than about 4 and less than about 8 and, in still other embodiments, the modified ORGANOSOLV™ extraction is carried out at a pH of more than about 5 and less than about 7.

In another embodiment, a hot water treatment may be used alone, or in combination with (e.g., following) a solvent extraction process, to extract additional lignin from plant material, and/or from a plant pulp material recovered following solvent extraction. Suitable hot water treatments may involve contacting the plant or pulp material with an aqueous solution (e.g., water) at an elevated temperature (e.g. from about 130° C. and 220° C.) and at an elevated a pressure (e.g. from about 2-25 barg) for a retention time sufficient to remove hemicellulose sugars from the plant and/or plant pulp material, and then separating the aqueous solution from the treated solids and harvesting isolated lignin from the aqueous solution to produce a high grade lignin product.

Water-soluble sugars such as xylose, as well as acetic acid and/or furfural may also be recovered from the aqueous hot water treatment solution. The resulting plant pulp material may be further processed to hydrolyze cellulose present in the plant material to glucose. This further processing may, for example, involve saccarification and/or fermentation. In one embodiment, the resulting plant pulp material is contacted with: (i) an aqueous solution comprising cellulase, β-glucosidase and temperature-tolerant yeast, (ii) yeast growth media, and (iii) buffer to hydrolyze cellulose present in the plant pulp material to glucose, which in turn may be fermented to produce ethanol.

Lignin extracted from plant materials in a solvent extraction process as described above may be isolated and harvested, for example, by precipitation. Precipitation of isolated lignin may be accomplished, for example, by dilution of the solvent mixture (generally from about 2 to 10 times, by volume) with an aqueous solution such as water and, optionally, by lowering the pH to less than about 3 by addition of acid. Addition of acid is generally not required, or the requirements are minimal, for harvesting lignin extracted from *Salix* and other hardwoods, but acid addition may be desirable for precipitation of lignin derived from other plant materials. In general, the use of hydrochloric acid is preferred to the use of other mineral acids if acid addition is desirable for precipitating lignin. This may desirably reduce the formation of condensation reaction products during processing. The isolated lignin precipitate may be harvested by filtration or centrifugation or settling, and dried.

Alternatively, lignin extracted from plant materials in a solvent extraction and/or a hot water process and solubilized in an aqueous solvent solution may be isolated, for example, using a dissolved-gas-flotation process (e.g., "DAF-like process"). The solubilized lignin and solvent solution (e.g., black liquor) is generally cooled and may optionally be filtered, and is then mixed with a gasified solution. The gasified solution is generally an aqueous solution such as water. The volume of gasified solution is preferably from about 2 to 10 times that of the lignin solvent solution. In one embodiment, black liquor may be introduced into a mixing device that provides conditions of generally high fluid shear to provide rapid and substantially complete mixing of gasified solution with the black liquor. The gasified solution may be supersaturated, for example, with a gas such as $CO_2$, nitrogen, air, or a gas mixture. During mixing with the aqueous solution, the hydrophobic lignin precipitates and is immiscible in the aqueous solution. Gas bubbles attach to the precipitated lignin and transport the precipitated lignin to the surface of the vessel, where it may be harvested using a DAF clarifier or by physical removal of the precipitated, buoyant lignin particulates. This lignin separation technique is an effective and gentle processing technique for recovering high grade lignin isolated from plant material using solvent extraction techniques, and may additionally be used to isolate lignin extracted from plant material using other techniques for extracting lignin from plant materials. Lignin separation and harvesting using a dissolved-gas-flotation technique may be carried out on either a batch basis or a continuous or semi-continuous processing basis.

In another aspect, methods for recovering lignin from an aqueous suspension of lignin are provided. These methods may be useful in recovering lignin which has been precipitated from an aqueous ethanol solution by dilution, and the precipitate subsequently washed in water. Such methods include adding at least one component selected from the group consisting of: ethanol at a concentration of less than 40% v/v; ammonium salts other than ammonium bicarbonate; and detergents other than Tween™ 80 or sodium dodecyl sulphate. This causes the lignin to flocculate, whereby the lignin may be readily harvested from the suspension. In certain embodiments, ethanol is added at a concentration of between about 2% and 38% v/v, for example at a concentration of about 9% to about 29% v/v. The ammonium salt may, for example, be ammonium sulfate or ammonium chloride, and may be added at a concentration greater than 4 mM. Detergents that may be effectively employed in such methods include, but are not limited to, Triton™ X-100, Triton™ X-114 and Nonidet™ P40. In one embodiment the detergent is added at a concentration greater than 4 ppm. This method can be useful for desalting any type of lignin preparation, to separate lignin from unreacted product and/or to selectively recover lignin sub-fractions for specific applications.

Because of its superior quality and its distinctive properties and structure, the high grade isolated lignin disclosed herein may be preferred over lignin isolated using different methodologies in the formulation of lignin-containing materials. The high grade lignin disclosed herein may be introduced, for example, in a variety of carbon based materials to provide products having an equivalent or higher quality than those produced using fossil fuel-derived raw materials or feedstocks, or other plant-derived lignins. Because of its superior blending capacity, the high grade isolated lignin disclosed herein may also be introduced in generally high proportions in a variety of resins used in the formulation of adhesives, films, plastics, paints, coatings and foams. The disclosed isolated lignin is also suitably reactive with other materials containing cross-linkable functional groups and amenable to chemical modification, resulting in increased reactivity. In general, shorter reaction times are required, and lower amounts of reactant are used and lost in processing isolated lignin of the present invention, resulting in cost reduction and more efficient chemical lignin modification. Also, as a consequence of its substantial homogeneity and purity, the thermal degradation of the isolated lignin disclosed herein generally yields a less complex mixture of products that may be upgraded or purified in further processing.

Isolated lignin of the present invention, derived from renewable and sustainable plant sources may be used, in many applications, as a substitute for petrochemicals and fossil fuel derived materials that are currently used as raw materials in the plastics and chemical industries. As a consequence of its distinctive structural properties, substantial homogeneity and composition, isolated lignin disclosed herein may be used, for example, as a renewable and sustainable phenol biopolymer for synthesizing phenolic and epoxy resins, providing a substitute feedstock for the petrochemical-based phenol polymers that are currently used as feedstocks for synthesizing phenolic and epoxy resins.

Phenolic resins encompass a variety of products formed by the reaction of phenol and aldehydes. Phenolic resin based adhesive acts as a matrix for binding together various substrates, including wood, paper, fibers (e.g., fiberglass), and particles (e.g., wood flour, foundry sand, etc.), to form cross-linked composites. Other aromatic hydrocarbons used in these reactions include cresols, xylenols, and substituted phenols. The aldehydes are usually formaldehyde, paraformaldehyde and/or furfural. Various other additives and reinforcing compositions may also be used to provide resins and end-use materials having a variety of properties.

Epoxy resins, like phenolic resins, are liquid or solid resins which cure to form hard, insoluble, chemical resistant plastics. Resins derived from bisphenol-A are among the most widely used epoxy resins. Bisphenol A is produced by liquid-phase condensation of phenol with acetone (a by-product of phenol synthesis). The chemistry of epoxy resin and the range of commercially available variations allow cured polymers to be produced with a very broad range of properties. The exceptional adhesion performance of epoxy resin is due to the presence of polar hydroxyl and ether groups in the backbone structure of the resin. Epoxy resins are also known for their chemical and heat resistance properties. There are many ways of modifying epoxy resins: for example, addition of fillers, flexibilizers, viscosity reducers, colorants, thickeners, accelerators, adhesion promoters. As a result many formulations tailored to the requirement of the end user can be achieved. These modifications are made to reduce costs, to improve performance, and to improve processing convenience. The applications for epoxy based materials are extensive and include coatings, adhesives and composite materials. Tremendous growth in the electronics market has markedly increased the demand for the epoxy resins for the manufacture of printed circuit boards and epoxy moulding compounds for semiconductor encapsulation.

Lignin has been used as a phenol replacement in thermoset resin. Olivares, (1988), Wood Science and Technology, 22:15; Sarkar (2000), Journal of Adhesion Science and Technology, 14:1179; Çetin (2002) Int. J. Adhesion and Adhesives 22:477; Çetin (2003) Turk. J. Agric. For. 27:183-189; Sellers, (2004) For. Prod. J. 54:45. Phenolic adhesive (liquid or powder) has been formulated with lignin from various sources to replace from 20-80% of the phenol component, or as filler in the resin itself. The inclusion of lignin in resin formulations generally reduces the curing time and the cost of production of the resin, and yields a product with improved strength, water resistance, thermal stability and durability.

The use of lignin to partially displace phenol in adhesive manufacture has also been successfully applied to the manufacture of friction products including automotive brake pads and mouldings. The preference for lignin, in the case of phenol-formaldehyde based adhesives, is also based on documented co-displacement of formaldehyde in addition to the reduction in emissions of toxic volatile organic compounds. Bisphenol A based epoxy adhesive has been modified by polyblending with lignin.

Epoxy resin formulations containing at least 50% lignin exhibit acceptable physical and electrical properties for a wide range of applications. IBM developed epoxy/lignin resin formulation for the fabrication of printed wiring boards to reduce the environmental concerns with the fabrication, assembly, and disposal of this product. The laminates formed from lignin based resins are processed in a similar fashion to current laminates, minimizing the financial considerations of converting to this resin system. In one study, a comparison of the lignin-based resin and current resins through a life-cycle assessment indicated a 40% reduction in energy consumption for the lignochemical based resin. Isolated lignin of the present invention may be used in any and all of these applications.

The disclosed lignin may also provide a polyol backbone for reaction to produce compositions such as polyurethane resins. In this application, the disclosed lignin may replace petrochemical-based polyol feedstocks currently used in the production of polyurethane resins. Polyols are compounds with multiple hydroxyl functional groups available for organic reactions. More than 75% of all the polyols produced globally are used in the manufacturing of polyurethane resin. The polyols provide the backbone structure of the PU resin and may be polyether, polyester, polyolefin or vegetable oil based; the first two being the most widely used. Polyether-based polyols are generally obtained from the base-catalyzed polymerization of cyclic ethers (propylene, ethylene and butylene oxides) to a hydroxyl or amine-containing initiator. Polyester polyols are generally produced by condensation of a diol (ethylene glycol, propylene glycol) and a dicarboxylic acid. Aromatic polyester polyols are generally derived from phthalic acid. A major cost in the production of polyols is attributed to the costs of propylene oxide. Propylene oxide (PO) is a liquid commodity chemical (derived from butane/isobutane, propylene, methanol and oxygen), used in the production of derivative products, including polyether polyols, propylene glycol, propylene glycol ethers and various other products.

Polyether polyols are used for the formulation of polyurethane resin for manufacture of softer, elastic and more flexible products (spandex elastomeric fibers and soft rubber parts, as well as soft foam) used in automobile and recreational vehicle seats, carpet underlay, furniture upholstering, bedding, and packaging. Polyfunctional polyester polyols are largely used in the formulation of polyurethane resin used for the manufacture of more rigid products such as low density foams of high grade thermal insulation, or structural construction products. Polyurethane rigid foam has grown in use because of its combination of low heat transfer and cost effectiveness. Applications for polyester flexible urethane foam include gaskets, air filters, sound-absorbing elements, and clothing inter liners (laminated to a textile material). Generally, polyether-based foams have a greater hydrolysis resistance, are easier to process, and cost less. Polyester-based foams have a more uniform structure with higher mechanical properties and better oil and oxidative degradation resistance. Both types can be sprayed, moulded, foamed in place, or furnished in sheets cut from slab.

Aromatic polyester polyol has become the polyol of choice for the formulation of rigid polyurethane foam. The use of aromatic polyester polyol in conjunction with polyurethane chemistry has counteracted the adverse effects of the flammability characteristic resulting from a change to non-CFC blowing agents. Polyester polyols provide superior mechanical properties, such as tensile strength, abrasion, and wear resistance, as well as solvent and oil resistance, to the polyurethanes in which they are used. With the phase-out of hydrochlorofluorocarbon blowing agents, polyester polyol producers are challenged to provide products to the polyurethane industry suitable for use with next generation blowing agents. New products must produce foams with an excellent balance of properties, and concurrently maintain cost-effectiveness and environmentally friendliness.

Lignins, like polyols, have multiple aromatic and aliphatic hydroxyl functional groups making them reactive towards MDI or TDI (diphenylmethane diisocyanate (MDI) or toluene diisocyanate (TDI)). With its aromatic ring, lignin can act as a flame retardant (like phthalic acid derived aromatic polyester polyol) in polyurethane applications. Lignin has been used to replace the polyol component of polyurethane resins, prepared by the polyaddition reaction of a difunctional isocyanate molecule to the hydroxyl groups of the polyol forming a series of block copolymers with alternating hard and soft phases. A whole spectrum of PU can be prepared from a wide range of polyols with different functionality and molecular weights and just a few types of di-isocyanate. One of the most desirable attributes of polyurethanes is their ability to be turned into foam by the addition of a blowing agent. Use of lignin in the rigid foam industry would improve both hydrolytic and UV resistance. Lignin of the present invention may be efficiently introduced in the formulation, for example, of polyurethane coatings, adhesives and foams.

The isolated lignin disclosed herein may be used in any and all of these applications, for example, as a filler or to replace specific components in the formulation of plastics resins (such as phenols, epoxies, polyurethanes, polyvinyls, polyethylenes, polypropylenes, polystyrenes, polyimides, polycarbonates, formaldehydes, acrylics, acrylonitrile-butadienestyrenes and alkyds-based), used in the manufacturing of themoset or thermoplastic material such as adhesives, binders, coatings, films, foams, rubbers, elastomers, carbonfibers and composites.

Polyvinyl chloride (PVC) is an extremely versatile material and can be converted into rigid products, and flexible articles when compounded with plasticizers. Unmodified PVC resin has very little utility due to poor physical properties and processability. PVC is almost always converted into a compound by the incorporation of additives such as plasticizers, heat stabilizers, light stabilizers, lubricants, processing aids, impact modifiers, fillers, flame retardants/smoke suppressors, and, optionally, pigments. Rigid PVC applications include pipes and fittings largely for water service; profiles for windows, doors, and siding; film and sheet for packaging and construction; and blow moulded containers for household and health and beauty products. Flexible PVC with high plasticizers loading is used in a variety of applications including film and sheet for packaging, coated fabrics for upholstery and wall coverings, floor coverings for institutional and home use (bathrooms and kitchens), tubing for medical and food/drink uses, and wire and cable insulation.

The manufacture of PVC is generally expensive, and raw material costs are generally high. In addition, there is considerable PVC-related toxicity, including toxic and potentially endocrine-disrupting effects of various additives used in PVC compounds, use of chlorine with potential for atmospheric ozone depletion, formation of dioxin from incineration of PVC and possible leaching of hazardous materials following disposal of PVC. Partial replacement of PVC (20 parts) with different lignins is already feasible for some formulations that can be successfully used as matrices for a high level of calcium carbonate filler in flooring products. The introduction of the isolated lignin of the present invention in these types of materials will not only reduce the cost and environmental imprint of plastics made from these materials but will also produce plastics with a better resistance to UV, thermal, hydrolytic, oxidative and biological destabilization.

Carbon fibers are generally used as long, thin strands of material about 0.005-0.010 mm in diameter, and composed mostly of carbon atoms. Several thousand carbon fibers are twisted together to form a yarn, which may be used itself, or woven into a fabric. The yarn or fabric may be combined with epoxy, for example, and wound or moulded into shapes to form various composite materials.

Carbon fibers are generally made using a partly chemical and partly mechanical process. Acrylonitrile plastic is mixed with another plastic (such as methyl acrylate) and reacted with a catalyst. The precursor blend is then extruded into long fibers, and stretched to a desired diameter. The fibers must then be stabilized (via heating in air at low temperatures 200-300° C.), before carbonizing them (via heating in the absence of oxygen at high temperatures (e.g. 1000-3000° C.). The fibers undergo a surface oxidation to allow them to react more effectively with chemical and mechanical bonding. The final treatment is to coat the fibers (sizing) which protects them from damage in winding and weaving. The coated fibers are wound onto bobbins, and are referred to as a "tow" that can be twisted into yarns of various sizes. Carbon fibers are generally supplied by producers as a continuous fiber or as a chopped fiber. Carbon fibers may be combined with thermoset and thermoplastic resin systems and are mainly applied to reinforce polymers, much like glass fibers have been used for decades in fiber glass. They have many uses in specialty type industries like the aerospace industry, and automobile industry.

The disclosed lignin may be used as a carbon skeleton suitable for manufacturing carbon fibers and carbon fiber compositions, and may replace synthetic polymers such as polyacrylonitrile (PAN) in the production of carbon fibers and carbon fiber compositions.

The disclosed lignin moreover provides a superior feedstock that may be broken down to provide aromatic or repeated units that are useful as fine chemicals. In addition, the disclosed lignin may be used as a superior quality feedstock for thermodegradation to bio-oil, synthesis gas, char, or fine chemicals via hydrothermal treatment, gasification or pyrolysis. The high grade isolated lignin disclosed herein may also be employed as a plasticizer, as a UV stabilizer, as described, for example, in U.S. Pat. No. 5,939,089, or as a water repellent.

In addition, because of its unique properties (molecular weight profile, chemical and molecular structures), the lignin disclosed herein can be employed in various applications to provide antioxidant, immunopotentiation, anti-mutagenic, anti-viral and/or anti-bacterial activity, and to improve the general health of animals or humans.

Because the disclosed isolated lignin has a generally high reactivity and a generally low contaminant composition, higher ratios of the disclosed isolated lignin can be used as a feedstock for making many products requiring polymer feedstocks without deleteriously affecting the properties of the final product. As a result, the high grade isolated lignin disclosed herein may be employed in a wide range of products, leading to a reduction in the amount of fossil fuel carbon, toxic substances and non-biodegradable materials required to manufacture these products and thereby contributing to the efficient and sustainable use of resources. In addition, the high grade isolated lignin disclosed herein is a relatively inexpensive feedstock and drastically reduces the cost of materials such as carbon composites, epoxy-type resins, polyurethane and other products that otherwise require high cost, petrochemical-derived feedstocks.

Processing of biomaterials using a modified ORGANOSOLV™ process that employs a low boiling solvent, preferably comprising ethanol, and substantially in the absence of an acid catalyst, also increases the recovery and integrity of xylan polymers. In a hot water treatment, either alone, or following a solvent extraction process, the xylan polymers are hydrolyzed, yielding their monomer units in the water hydrolysate. The xylose rich water hydrolysate provides another valuable product stream from which crystalline xylose, furfural and/or xylitol may be derived. The xylose rich water stream may also be used as a fermentation substrate for the production of ethanol, xylitol and other valuable fermentation products, providing additional valuable polymer feedstocks for use directly or for further processing.

Xylose may thus also be produced using the processing methodology disclosed herein. Specifically, large quantities of the five carbon sugar xylose are released as a yellow liquor in a hot water washing of pulp, independently of or following lignin removal by solvent extraction. Currently, xylose-rich yellow liquors are generally produced by acid hydrolysis of birch wood, bagasse, rice husks, corn and wheat straw. Xylose, furfural, xylitol and other products of an extraction process (e.g., a hot water extraction process as disclosed herein), using the plant material feedstocks disclosed, herein are also contemplated as products of the present invention.

Xylose is used for the production of furfural used in the formulation of industrial solvents. Xylose of the present invention may be used for the production of furfural, as well as directly, or in xylose-derived products, as a food or beverage additive in human, animal and other organism feeds. In addition, xylose of the present invention may be used as a feedstock for conversion (e.g., via hydrogenation) to xylitol, a sugar alcohol used as non-carcinogenic, low calorie sweetening compound. Xylose and concentrated xylose syrups and crystalline cellulose of the present invention are suitable for use as ingredients by food industries (human and animal, for example). The xylose-rich yellow liquor of the present invention may also be used without further processing as a fermentation substrate for the biochemical production of ethanol. In various aspects, products of the present invention include: the xylose-rich yellow liquor derived using the methods disclosed herein; xylose isolated from the yellow liquor; and yellow liquor and isolated xylose derived from hardwoods, including copiccable hardwoods such as *Salix*, as well as from the other plant material raw materials disclosed herein.

Xylitol is used as a low calorie food sweetener. It is as sweet as sucrose, provides a cooling effect, has no after-taste, and is safe for diabetics as it is metabolized independently of insulin. It has 40% less calories than sugar and is the only sweetener to show both passive and active anti-caries effects. Xylitol is used in a wide range of applications in the food industry as a sugar substitute (e.g. in confectionery, gum and soda) and in the pharmaceutical and personal care industries (e.g. in oral hygiene products and cosmetic products).

Xylitol is produced commercially by hydrogenation of xylose obtained from birch wood sulphite pulping liquor and other xylan-rich substrates. The production process involves the extraction and purification of xylose from the pulping liquor, a chemical hydrogenation reaction, and the recovery of xylitol by chromatographic methods. The chemical based conversion of xylans to xylitol is approximately 50-60% efficient. Alternative technology based on microbial reduction of xylose from xylan rich hydrolysate is considered to be 'cleaner' and generally requires less energy than the chemical conversion. The present invention contemplates xylitol produced by hydrogenation of xylose isolated from hardwoods, including coppicable shrubs such as *Salix*. In various aspects, products of the present invention include: xylitol produced using the xylose-rich yellow liquor derived using the methods disclosed herein; xylitol produced using xylose isolated from the yellow liquor; and xylitol produced using isolated xylose derived from hardwoods, including coppicable hardwoods such as *Salix*, as well as from the other plant material raw materials disclosed herein.

Furfural is an aromatic aldehyde obtained by catalytic dehydration of a xylose concentrate solution. Furfural is an intermediate commodity chemical used in synthesizing a range of specialized chemical products, starting mainly with furfural alcohol (FFA), which also has many derivatives. Furfural is used in the production of resin (phenol, acetone, or urea based) used as a binding agent in foundry technologies or in the manufacture of composite for the aeronautic and automotive industries. Furfural is also used as a selective solvent in petroleum production of lubricants. There are many other uses (e.g. adhesive, flavoring and as a precursor for many specialty chemicals), but resins account for over 70 percent of the market. Furfural is highly regarded for its thermosetting properties, physical strength and corrosion resistance. Furfural is important in terms of its presence, as a carbohydrate, in a chemical industry dominated by hydrocarbons.

In addition to providing a high quality xylose suitable for conversion to furfural, modified ORGANOSOLV™ treatment followed by hot water extraction provides a furfural-rich yellow liquor. In various aspects, products of the present invention include: furfural produced using the furfural-rich yellow liquor derived using the methods disclosed herein; and furfural derived from hardwoods, including coppicable hardwoods such as *Salix*, as well as from the other plant material raw materials disclosed herein.

In yet other aspects, products of the present invention include celluloses, sugars (e.b., glucose), hemicelluloses, and downstream products produced using such products, including ethanol and other fermentation products derived from hardwoods, including coppicable hardwoods such as *Salix*, as well as from the other plant material raw materials disclosed herein.

These and additional features of the present invention and the manner of obtaining them will become apparent, and the invention will be best understood, by reference to the following more detailed description and the accompanying drawings.

DETAILED DESCRIPTION

As discussed above, the present invention provides high grade isolated lignin polymers obtained from processing of plant materials, such as lignocellulosic plant materials. Ligocellulosic plant materials are harvested, air-dried and stockpiled. Reduction of the particle size of the harvested plant material may be desired prior to processing, and this can be achieved using a chipper or similar device to mechanically reduce the size of the plant material feedstock. Suitable size reduction techniques are well known in the art and one of ordinary skill in the art may readily determine appropriate particle sizes and size distributions for various types of feedstocks used in the present invention.

Figure 1:
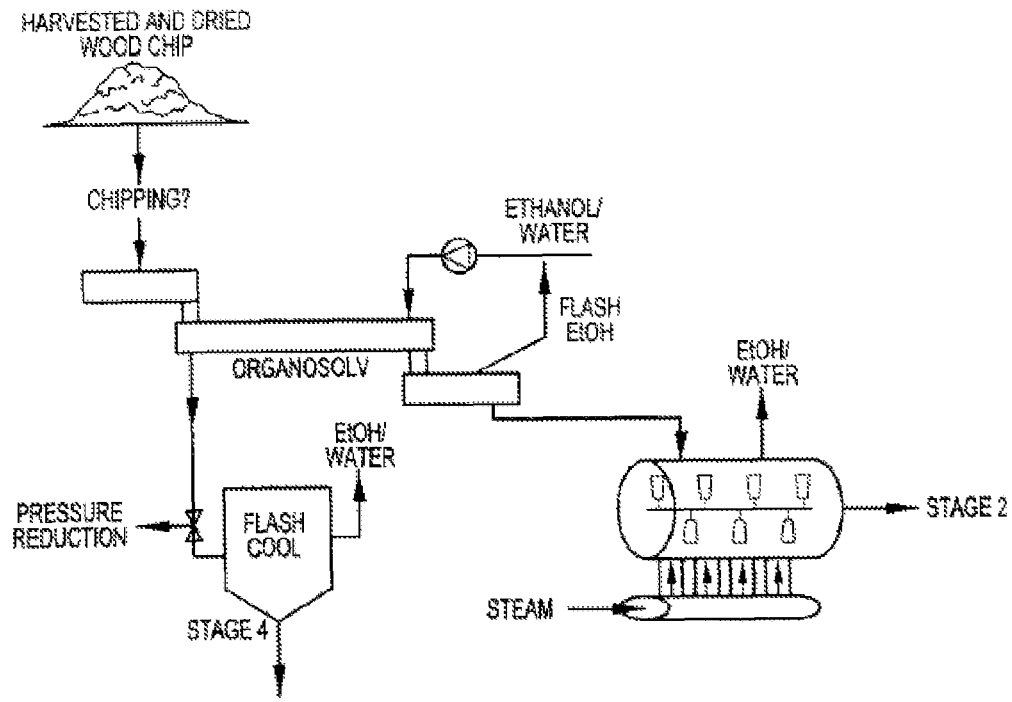
FIG. 1 is a schematic of the first stage (ethanol extraction) of an integrated process for the production of biofuel and lignin from wood chips.

In one solvent extraction methodology, the first stage of the process disclosed herein is a modified ORGANOSOLV™, or aqueous ethanol extraction (illustrated schematically in FIG. 1). In one embodiment, this involves continuously contacting a lignocellulosic plant material with a counter-current flow of an aqueous solution comprising up to 80% ethanol, undertaken at a temperature of approximately 170° C. to 210° C. and a pressure of 19-30 barg. In one embodiment, the digester is a screw contactor operating with wood chips being fed and discharged via cup and cone pressure plugs or feed screws. Solvent passes against the flow of solids so that plant material exiting the digester is exposed to fresh (solute free) ethanol solution, while chips entering the digester, which have the highest extractable content, are exposed to the most solute laden solvent solution.

Solvent entering the digester may be pressure pumped to maintain the operating pressure therein and to provide the hydraulic drive to pass against the flow of chips. Solvent from within the digester is re-circulated through external heaters, for example steam heaters, on a continuous basis to bring the wood chips up to the operating temperature quickly and to maintain the temperature. Operating conditions (such as time, temperature profile, pressure and solids/liquid ratio) within the digester may be optimized to provide maximum removal of water insoluble lignin from the plant material. As the plant material exits the digester and is exposed to lower pressures, a portion of the solvent content therein evaporates, resulting in cooling of the treated plant material. In alternative embodiments, the plant material may be displaced in the digester using gravity in a downward gradient. Solvent entering the digester may be pumped against the flow of solids. Multiple solvent extraction stages may be provided. Lignin is solubilized in the aqueous ethanol solvent ("black liquor") and may be isolated from the "black liquor" produced during solvent extraction.

Plant material, or pulp, discharged from a solvent extraction stage of the process still contains some ethanol, which is preferably removed prior to a subsequent water extraction step. Solvent removal may be achieved by means of a steam stripping operation. The vapors recovered from both this operation and from other solvent recovery techniques, may be collected and re-used directly with the fresh solvent stream. In this way the latent heat content of the vapors is recovered.

Figure 2:
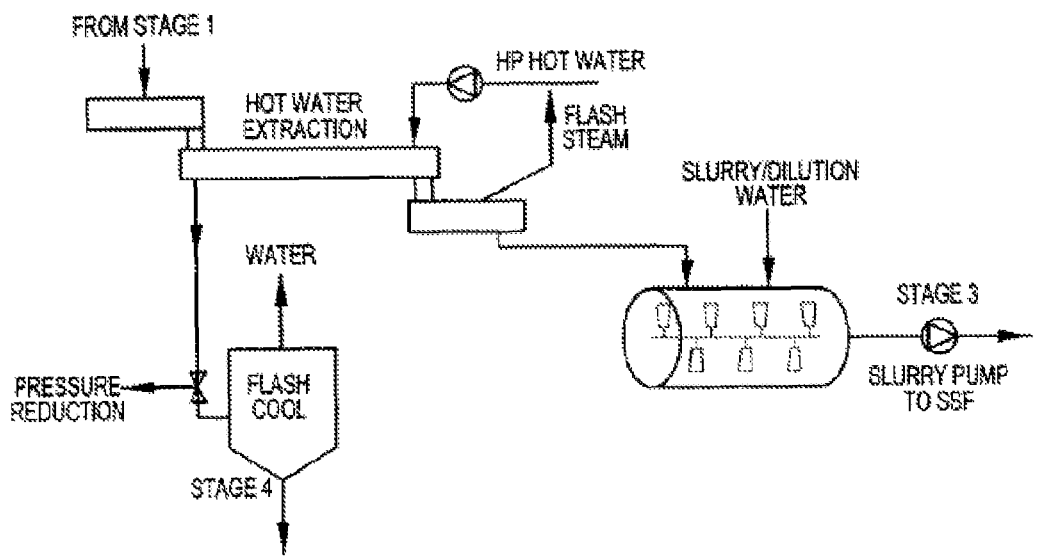
FIG. 2 is a schematic of the second stage (hot water treatment) of an integrated process for the production of biofuel and lignin from wood chips.

The de-solventized plant pulp material may optionally be processed in a second stage of extraction (illustrated schematically in FIG. 2), which may be undertaken in comparable equipment and in a comparable fashion to the ethanol extraction described above, with the difference being that high pressure hot water (preferably at a pressure of approximately 2 to 25 barg and a temperature of approximately 130° C. to 220° C.) is utilized to solubilize the hemicellulose sugars in the plant pulp material. As the solids exit the hot water digester and the pressure is reduced, flash evaporation of steam occurs. This may be recovered for direct re-use with the fresh hot water entering as fresh extraction solvent at the solids discharge end of the digester. The treated plant pulp is also cooled as a result of this flash evaporation.

Figure 3:
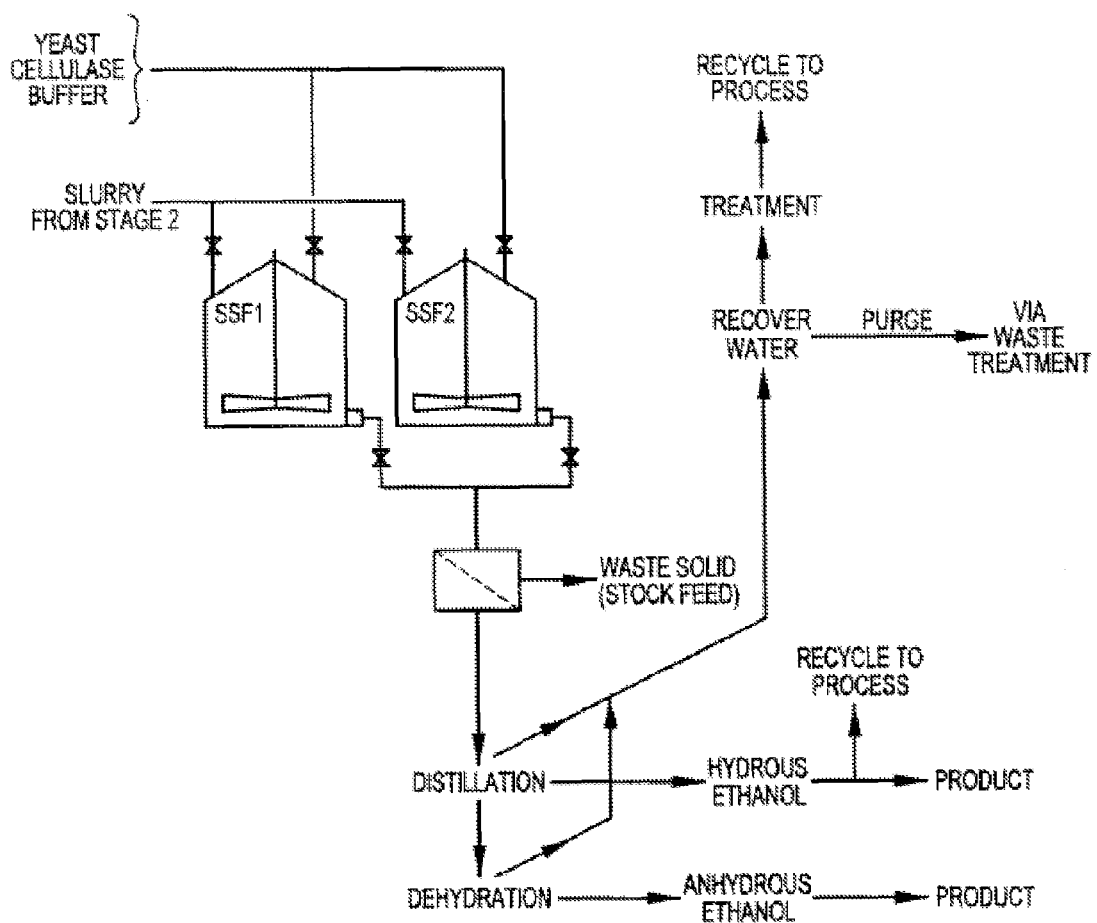
FIG. 3 is a schematic of the third stage (simultaneous saccharification and fermentation) of an integrated process for the production of biofuel and lignin from wood chips.

The non soluble constituents of the initial plant material that remain in the pulp after two stages of extraction (solvent and hot water) are primarily cellulose and other sugars present in the form of a hydrolyzable pulp. This material may be hydrolyzed to produce glucose. In one hydrolysis procedure, the hydrolysable pulp is transferred to one of a series of batch SSF (simultaneous saccharification and fermentation) vessels, together with temperature-tolerant yeast, yeast growth media, cellulase, β-glucosidase, buffer and water to dilute the solids to the required solid/liquid ratio (illustrated schematically in FIG. 3). In these vessels, the cellulose is hydrolyzed to produce glucose, which is in turn fermented to produce ethanol. Low levels of ethanol are maintained in the fermentor by continuous removal of the produced ethanol to avoid fermentation inhibition. The process is optimized for maximum cellulose hydrolysis and fermentation to ethanol. The vessel contents at the end of the batch fermentation will be discharged via a filter and the retained solids will be disposed of, or recovered to be further processed to yield additional products. The filtrate, consisting primarily of ethanol and water, may be concentrated to produce hydrous and/or anhydrous ethanol as desired, using methods well known to those of skill in the art. A portion of the hydrous ethanol product may be re-utilized in the first, ethanol extraction stage.

Figure 4:
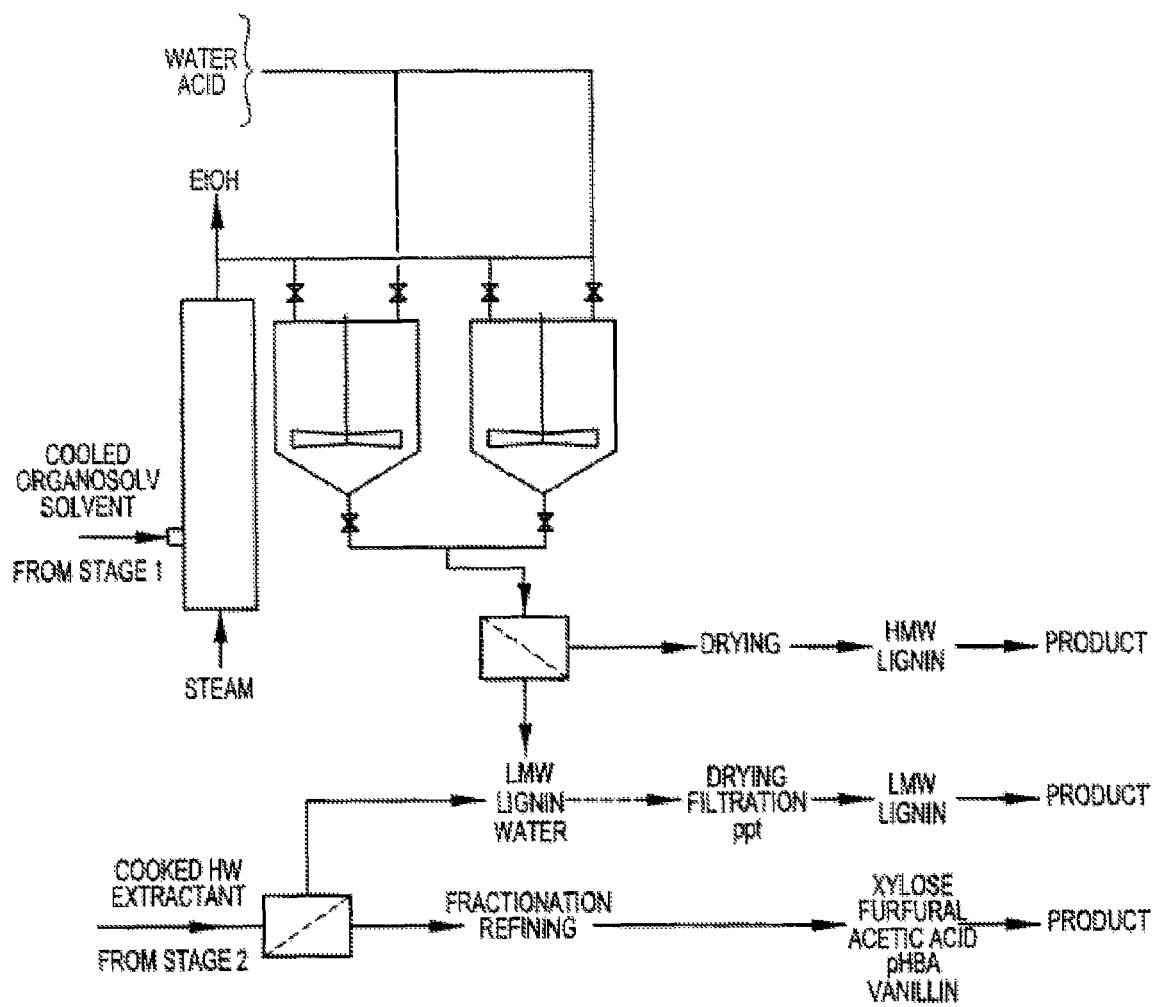
FIG. 4 is a schematic of the fourth stage (product separation/purification) of an integrated process for the production of biofuel and lignin from wood chips.

Products, such as high grade lignin, are separated and purified as illustrated schematically in FIG. 4. In one embodiment, the black liquor (ethanol/water/lignin solution) exiting the solvent extraction digester in the first stage may be depressurized before passing to a flash cooling vessel in which the solvent is evaporated. Further ethanol may then be steam-stripped from the liquor prior to transfer to one of a series of batch vessels, in which precipitation of lignin from the liquor is promoted through dilution (generally from about 2 to 10 times, by volume) with water. The pH of the diluted black liquor may be reduced by acid addition to increase the lignin precipitation rate, if desired. After settling, the lignin sludge may be dewatered by filtration and/or centrifugation and dried to produce an isolated lignin product.

Alternatively, the lignin solubilized in the black liquor may be recovered using a dissolved gas flotation (DAF-like) based process as described below. Because of its low cost, gentle recovery conditions and rapid recovery, the dissolved gas flotation method described herein is preferred for many lignin isolation and harvesting processes compared to conventional methods like settling and centrifuging and may be used to harvest lignin extracted from plant materials using a variety of extraction techniques. In this embodiment, after flash cooling, the black liquor may optionally be filtered and the solubilized lignin in an aqueous solvent solution is then mixed with a gasified aqueous solution (e.g., water). The gasified solution contains a high concentration of a gas such as air, nitrogen, $CO_2$, mixtures thereof, and the like. The pressure and gas flow rates may be adjusted to provide desirable gas concentrations, properties, etc. in the lignin recovery vessel.

Gasified aqueous solutions may be prepared, for example, by storing water in a pressure vessel under nitrogen, carbon dioxide or any other suitable gas at a pressure of at least 2 barg. The water level in the pressure vessel is regulated by the use of a float valve or similar device. Compressed air, nitrogen or carbon dioxide (such as $CO_2$ recovered from the fermentation process) may be admitted at the base of the tank, and the incoming gas may be passed through a sparger to increase the dissolution rate of the gas in the aqueous solution. The gasified solution is withdrawn from the pressure vessel through a metering valve which regulates its flow rate. As the gasified solution leaves the tank and is mixed with the black liquor, the decrease in pressure leads to the generation of many small gas bubbles ("microbubbles") which attach to the hydrophobic lignin precipitate as it forms, and cause it to float to the surface.

In one embodiment, (optionally filtered) black liquor comprising lignin solubilized in an aqueous solvent solution is pumped (using, for example, a metering pump) into a mixing device, such as a venturi mixer or a similar device. The mixing device preferably creates conditions of high fluid shear to provide rapid and complete mixing of the gasified water with the black liquor, and is preferably constructed from materials that minimize the amount of lignin adhering to the surfaces of the device. When the solubilized lignin is diluted in the aqueous solution, the hydrophobic lignin precipitates and forms immiscible particulates in the aqueous solution. Microbubbles of gas attach themselves to the immiscible lignin particles and transport them to the surface of the mixed solution. The floating lignin may then be separated by mechanical means. In one embodiment, the floating lignin particulates are pushed toward a conveyer belt by means of a paddle, for example. The conveyer belt may be constructed from a porous material, allowing partial dewatering of the lignin as it is harvested. The speed and length of the conveyer belt may be adjusted to provide optimum harvesting efficiency and lignin drying. It will be apparent to one of ordinary skill in the art that different types of lignin harvesting processes may also be used. After lignin removal, the ethanol may be separated from the water and recycled, while the aqueous fraction may be combined with a hot water stream for use in further processing, such as xylose and water soluble product recovery.

The present invention further provides methods for recovering lignin from an aqueous suspension of lignin. In one embodiment, the lignin may be recovered from water washes by a process in which ammonium salts (e.g., 10 mM ammonium chloride or ammonium sulfate, but not ammonium bicarbonate) or low concentration detergents (e.g., 50 parts per million of Triton™ X-100 (($C_{14}H_{22}O(C_2H_4O)n$)) or Nonidet™ P40 (nonylphenyl-polyethylene glycol), but not Tween™ 80 (polyoxyethylene (20) sorbitan monooleate) or sodium dodecyl sulphate, are added to the solution. This causes the lignin suspended in the water washes to flocculate, facilitating harvesting of the washed lignin. The effects of detergents and ammonium salts are additive. The use of ammonium chloride to aid in the harvesting of washed lignin precipitates may be particularly advantageous, as ammonium chloride is volatile, and excess ammonium chloride can thus be easily removed from the harvested lignin during the drying process. Ethanol may also be used to recover the washed lignin. At low concentrations (for example less than 35% v/v), ethanol induces the precipitation of lignin from a water suspension. The use of ethanol in this process is particularly advantageous because it is volatile and can thus be easily removed from the harvested lignin during the drying process.

Raw lignin material isolated from *Salix viminalis* or *Salix schwerinii* 'Kinuyanagi' using the process described above employing 70% aqueous ethanol at 185° C. for 60 minutes, and harvested by precipitation and centrifugation from the black liquor or using the dissolved gas flotation described above, was shown to have a high degree of similarity to natural lignin, to retain a high degree of reactivity and to be relatively pure, with a minimal amount of carbohydrate contamination. In preferred embodiments, isolated lignin preparations of the present invention comprise less than about 1.0% sugars; in some embodiments less than about 0.2% sugars and, in yet additional embodiments, less than about 0.5% sugars. In some embodiments, isolated lignin compositions of the present invention have a carbohydrate composition of less than about 0.2 g per liter supernatant detectable by HPLC using an ion exclusion column following hydrolysis of the lignin preparation with concentrated sulfuric acid. In addition, isolated lignin preparations of the present invention are substantially free from salts and particulate components.

Isolated lignin having a relatively high ratio of syringyl (S) units is preferred for many applications. Lignin extracted from *Salix viminalis* or *Salix schwerinii* 'Kinuyanagi,' or a mixture of both species, with 70% ethanol at 185° C. for a retention time of 60 minutes and harvested by precipitation and centrifugation was composed of approximately 80% syringyl (S) units (ratio S:G of 4:1) and had a low degree of chemical modification with a high proportion of β-aryl-ether and resinol subunits. In some embodiments, isolated lignin compositions of the present invention have a syringyl unit content of at least about 50%, in some embodiments, of at least about 60%, in yet other embodiments, of at least about 70%, and in still other embodiments of at least about 80%. Isolated lignin compositions of the present invention preferably have an S:G ratio of at least about 2:1; more preferably at least about 3:1 and, even more preferably for some applications, at least about 4:1.

Isolated lignin preparations made as described herein have an average molecular weight of about two to three times higher than comparative commercial Kraft and ORGANOSOLV lignin preparations, as demonstrated by the experimental evidence presented in Example 6, below. In some embodiments, isolated lignin compositions of the present invention have a weight average molecular mass (determined as described below) of at least about 4,000. In some embodiments, isolated lignin compositions disclosed herein have a weight average molecular mass (determined as described below) of at least about 4,500, and in yet other embodiments, the disclosed isolated lignin compositions have a weight average molecular mass (determined as described below) of at least about 5,000. In still other embodiments, isolated lignin compositions of the present invention have a weight average molecular mass (determined as described below) of at least about 5,500.

The isolated lignin preparations also have relatively high numbers of reactive hydroxyl groups that are important to provide reactivity with other chemicals or polymers, as well as high numbers of methoxyl groups of 30 to 40 per 100 units. In addition, the high grade isolated lignin disclosed herein is minimally modified and therefore has a reactivity that is closer to that of natural ("native") lignin. Isolated lignin compositions of the present invention generally comprise detectable quantities of at least three side chains selected from the group consisting of phenylcoumaran, resinol, α-ethoxy-β-aryl-ether, and cinnamyl alcohol side chains. According to some embodiments, isolated lignin compositions of the present invention comprise detectable quantities of phenylcoumaran, resinol, α-ethoxy-β-aryl-ether, and cinnamyl alcohol side chains. The side chains present in isolated lignin preparations may be detected and measured using nuclear magnetic resonance spectroscopy analysis, for example.

High grade isolated lignin compositions of the present invention generally have a high ratio of β-aryl-ether subunits, generally at least about 40%, in some embodiments at least about 50%, and in yet other embodiments at least about 60%. High grade isolated lignin compositions of the present invention also have a generally high ratio of resinol subunits, generally at least about 6%, in some embodiments at least about 8%, and in yet other embodiments at least about 10%.

Because of its purity, homogeneity and unique reactivity, the isolated lignin preparations obtained as described herein can be used without further processing. However, if desired, residual volatile compounds may be removed by heat treatment, and non-volatile residual compounds may be removed, for example, using a water wash. In some embodiments, the isolated, raw lignin may be recovered from a water suspension using a selective flocculation method as described herein. In some embodiments, the isolated lignin may be harvested from the black liquor using a dissolved gas flotation technique as described herein.

The high grade isolated lignin disclosed herein is useful as a feedstock for a variety of downstream industrial processes and material manufacturing processes. In one embodiment, the high grade isolated lignin described herein can be melted or dry spun at a desired temperature and speed to produce carbon fibers using methods well known to those of skill in the art and including, but not limited to, those taught in U.S. Pat. Nos. 3,461,082 and 5,344,921. Because of its homogeneity, the disclosed lignin has the capacity to form regular, continuous filaments of carbon during extrusion. Also, because of the higher S unit ratio and lower condensation level, lignin prepared from *Salix* using the process described herein is stable during the thermostabilization of the carbon filament. If required, the spinning, extrusion and/or carbonization can be facilitated by blending the disclosed lignin with a plasticizer (for example polyvinyl alcohol (PVAL), polyethylene oxide (PEO) or polyester (PES)) or by condensation of lignin units following chemical modification of the lignin. The melting and extrusion of polycondensed high grade lignin or lignin polymer blend can also be useful for the production of composites and plastics.

Superior lignin-based polyurethane (PU) can be formulated by using the disclosed lignin either directly as a polyol precursor or blended with other polyol types (for example, polyethylene glycol (PEG), polyethyleneadipate (PEA) and/or polypropylene glycol (PPG)) to react with an isocyanate radical of polyisocyanates or isocyanate-terminated polyurethane prepolymers either in the presence or absence of a catalyst. The efficient functionalization of the disclosed lignin with diisocyanates also allows, upon reaction with polyols, the formulation of a high quality PU resin. In addition, the disclosed lignin can be functionalized with an epoxide for further reaction with an isocyanate or added as filler to a prepared PU resin. PU resin prepared using the disclosed high grade lignin can be used as a lower cost, high quality, adhesive and/or coating, or can be easily cast and cured for the formation of high quality films. When water or a foaming agent is added to the formulation of the lignin based PU, foams of various density levels can be produced.

Superior phenolic resins can also be formulated from the disclosed high grade lignin. Because of its higher reactivity compared to Kraft and sulfite lignins, the disclosed lignin will provide a superior replacement of phenol in many phenol based resins used in a wide variety of applications, ranging from adhesives to composites. The disclosed high grade lignin can be either directly blended with the phenol resin or incorporated into the resin at high ratios by condensation or derivatization with phenol or formaldehyde. The disclosed lignin may thus be used to produce a safe and biodegradable resin.

The natural properties of the high grade lignin disclosed herein can be modified by polymer blending. The lignin is able to form proper hydrogen bonding for miscible blend formation with plasticizing agents such as polyethylene oxide (PEO), polyethylene terephthalate (PET), polyvinyl pyrrolidone (PVP), polyvinyl chloride (PVC), polyvinyl acetate (PVA), polyethene-co-vinylacetate (EVA), polypropylene (PP), polyethylene (PE) and others, allowing further control of its thermal processability. This can be useful, for example, to facilitate the spinning, extrusion and/or casting of the lignin-based final product, or in the making of adhesives, paints coatings, plastics and the like. The stronger intermolecular interaction between polymers and the disclosed high grade lignin will create superior lignin-polymer blends with a positive impact on the derived composite.

The viscoelastic properties of lignin can also be altered and modified through chemical introduction of unsaturated carbonyl groups or nitrogen-containing compounds. Another advantage of the unique properties of the disclosed high grade lignin is the efficiency and lower cost of chemical conversion of its phenol, alkene or hydroxyl moieties into other functional groups. The disclosed lignin is more amenable to alkylation and dealkylation, oxyalkylation (for example, oxypropylation, for production of polyoxyalkylene polyethers), amination, carboxylation, acylation, halogenation, nitration, hydrogenolysis, methylolation, oxidation, reduction, polymerization, sulfomethylation, sulfonation, silylation, phosphorylation, nitroxide formation, grafting and composite formation. In general, such lignin modifications are inefficient and costly due to the presence of impurities, heterogeneity and high level of altered moieties in the conventional lignin preparations. These modifications can be performed more efficiently and at lower cost on the disclosed high grade lignin to produce useful polymeric materials.

centage of glucan and xylan present in the samples were determined after chemical hydrolysis (4 hours with 72% sulfuric acid at 102° C.). Acid soluble sugar was measured by HPLC using the appropriate range of xylose and glucose standards. The composition of the untreated *Salix* material was determined and is shown below in Table 1.

TABLE 1

Composition of untreated *Salix* biomass

| *Salix* variety | Extractive (%) | Lignin (%) | | | Sugar (%) | |
| --- | --- | --- | --- | --- | --- | --- |
| | | Soluble | Insoluble | Total | Glucan | Xylan |
| *Salix viminalis** | 16 | 2 | 31 | 33 | 23 | 9 |
| *Salix viminalis* | 8 | 3 | 24 | 27 | 34 | 8 |
| *Salix schwerinii* | 6 | 5 | 23 | 28 | 32 | 14 |
| *Salix schwerinii Kinuyanagi* | 4 | 5 | 22 | 27 | 33 | 12 |
| *Salix schwerinii Kinuyanagi* | 4 | 3 | 25 | 28 | 33 | 9 |
| *Salix schwerinii Kinuyanagi* + *Salix viminalis* | 2 | 4 | 28 | 32 | 35 | 9 |
| *Salix schwerinii Kinuyanagi* + *Salix viminalis* | 2 | 4 | 25 | 29 | 30 | 8 |
| Average | 6 | 4 | 25 | 29 | 31 | 10 |
| Standard Deviation | 5 | 1 | 3 | 3 | 4 | 2 |

(*= Sieved material)

Reactive epoxy functionality can be added at lower cost to the disclosed high grade lignin than with conventional lignin preparations. The disclosed lignin can be directly reacted with ethylene-unsaturated groups or hydroxypropyl groups to prepare a lignin-based epoxide with good solubility that may be used in co-polymerization reactions. The disclosed lignin is also a superior substrate for conversion into polyols by propoxylation (reaction with propylene oxide such as 2-methyloxirane) or ethoxylation (reaction with ethylenoxide such as oxirane) chain extension reaction. Epoxide-lignin resin may be cured to a hard infusible plastic and may also be reacted with fatty acids to produce resins for paints and inks or may be reacted with various amines to produce polyamines or polyamides for use as adhesives or plastics. Epoxidized high grade lignin may also be employed to reduce the need for polyol in PU resin and for displacement of phenol epoxy resin.

The following examples are offered by way of illustration and not by way of limitation.

EXAMPLE 1

Recovery of Lignin from *Salix*

Preparation and Composition Analysis of Untreated *Salix* Biomass

Stems of *Salix viminalis* or *Salix schwerinii* 'Kinuyanagi' were chipped with a garden mulcher. The wood chips were dried at 40° C. for 24 hours and sieved by hand between two wire meshes of British test sieve with apertures of 2.8 and 4 mm. The composition of the sieved and unsieved *Salix* chips was assessed, with the results being shown in Table 1. The mass composition was assessed using laboratory analytical procedures (LAPs) developed by the National Renewable Energy Laboratory (NREL, Golden, Colo.). Values are expressed as gram of component per 100 g of dry untreated chips. Extractives were isolated using a Soxhlet extractor, dried and weighed. Lignin concentrations were determined after chemical hydrolysis of the *Salix* chips (4 hours with 72% sulfuric acid at 102° C.). Acid soluble lignin was measured by densitometry at 320 nm and the concentration of the non-acid soluble lignin was measured by weight minus ash. The per- Pre-treatment of *Salix* Biomass A modified ORGANOSOLV™ treatment of *Salix* chips was tested in 100 ml experimental digester and 3 l packed-bed experimental digester that were able to process 6 g and 300 g of dry wood chips, respectively. The design of these two digesters is illustrated in and described with reference to FIG. 5 (100 ml digester) and FIG. 6 (3 l packed-bed digester) of U.S. Patent Publication US 2007/0259412 A1. A 40 l digester was also designed and tested for the recovery of natural lignin from *Salix* biomass at larger scale (shown in and described with reference to FIG. 7 of U.S. Patent Publication US 2007/0259412 A1). The 40 l digester processed 6 kg of dry biomass. Process conditions for solvent treatment of the *Salix* chips and subsequent hot water treatment of the plant pulp material recovered from the solvent treatment are also described in U.S. Patent Publication US 2007/0259412 A1. Lignin from the 100 ml and 3 l digesters was harvested by precipitation and centrifugation as described in U.S. Patent Publication US 2007/0259412 A1. Lignin from the 40 liter digester was harvested by precipitation and centrifugation and, in some instances, by dissolved air flotation techniques described herein.

At all scales (100 ml, 3 l packed-bed, and 40 l batch), sequential solvent extraction using an aqueous solution comprising 70% ethanol followed by hot water treatment resulted in the removal of over 30% of the total lignin content of the untreated chips. The majority of the lignin (28 to 32%) was solubilized during the solvent extraction using the 70% ethanol aqueous solution, and an additional 3 to 8% of the total lignin was removed during the subsequent hot water treatment.

The ratio of lignin to DM removed by the 70% ethanol treatment reached 35% in the first hour of treatment retention time at a temperature of 170° C. to 190° C. using the 100 ml and the 3 l packed-bed digesters. The lignin composition of the DM removed in the 3 l packed-bed digester during the second hour of treatment retention time increased by 5% and reached 50% after 4 hours. After 8 hours retention time in the reactor, the lignin content of the DM removed increased only by another 10% to reach 60%. In the 40 l batch digester, the ratio of lignin to DM removed varied from 30 to 48% when Salix dry chips were treated with 70% ethanol solvent. The proportion of the total lignin content in the untreated chips that was recovered in the 70% ethanol solvent using each of the three digesters varied over time. The high recovery of total lignin (32% ±3) in 60 minutes using the smaller 100 ml digester reflected the higher rate of DM removal achieved with this digester. With the 3 l packed-bed digester, similar recovery was achieved within 200 to 240 minutes of treatment retention time. The amount of total lignin recovered using the 40 l batch digester varied between 22 and 44% of the initial lignin content of the Salix chips, corresponding to 6 to 13% of the initial DM loaded.

EXAMPLE 2

Harvesting Precipitated Lignin by Dissolved Air Flotation

Lignin was precipitated from black liquor, and the precipitate harvested using a dissolved gas (air) flotation technique ("DAF"), as follows. Water was supersaturated with nitrogen by storage under elevated nitrogen pressure (2 barg) for at least 30 minutes. The water was allowed to leave the pressure vessel through a metering valve which regulated the flow rate of aerated water at 26 ml/min. Filtered black liquor (containing 12.4 g of lignin per liter) was pumped from the black liquor tank at various flow rates using a peristaltic pump. The aerated water and black liquor were mixed in a venturi mixing device and delivered into a flotation tank. Upon rapid mixing with the gassified water, the lignin in the black liquor precipitated, flocculated and floated to the surface of the tank. The supernatant passed under a dam and overflowed out of the tank. Based on the tank volume and the liquid flow rates, the residence time of the precipitate in the tank was calculated to be about three minutes. A paddle wheel device was used to move the lignin precipitate to one end of the precipitation tank. A porous moving belt of nylon mesh was used to lift the precipitated lignin out of the tank and drain off the supernatant liquid. A Perspex scraper was used to harvest the lignin from the belt and allow it to fall into the collection tank.

The relative flow rates of the aerated water and black liquor were varied, and the best yields of precipitated lignin were obtained where the water flow rate was at least three times the black liquor flow rate. Various venturi mixing devices were tested, and the best devices were found to be those which delivered the black liquor into the venturi through a small nozzle having a diameter of approximately 0.2 mm. This provided black liquor linear velocities of about 5 m/sec, implying that high shear rates are important to give good mixing. The venturi throat which gave best mixing had a diameter of 1 mm, which would give a linear flow rate for the mixture of 0.7 m/sec.

Use of the optimal conditions detailed above gave a lignin harvesting yield of 89% of theoretical. A further 3.6% of the lignin yield remained in suspension, and floated to the surface of the supernatant at later times. This suggests that a longer residence time of the precipitate in the tank would give a higher yield. The lignin sludge harvested from the belt was found to contain 4% w/v lignin. Pressing the sludge between two pieces of filter paper increased the lignin concentration to 20% w/v. This indicates that a belt press or similar device could be used to increase the solids content of the lignin sludge, and consequently facilitate drying of the sludge. After air-drying, the lignin harvested by the DAF technique disclosed herein yielded a light brown powder containing about 10% moisture.

The precipitation was found to occur optimally at a temperature of about 20° C. Temperatures above 35° C. gave a dense, sticky precipitate in poor yield.

EXAMPLE 3

Large-scale Harvesting of Lignin by DAF

Lignin was precipitated from black liquor, and the precipitate harvested by dissolved gas (air) flotation, on a larger scale as follows. Water was supersaturated with air by storage under compressed air pressure (2 barg). The water was allowed to leave the pressure vessel through a metering valve which regulated the flow rate of aerated water at 4.5 l/min. Filtered black liquor (containing 14.8 g of lignin per liter) was pumped from the black liquor tank at 1.4/min using a peristaltic pump, and the aerated water and black liquor were mixed in a venturi mixing device and delivered into a flotation tank. (The mixing ratio of aerated water to black liquor was 3.2:1) The venturi jet had a diameter of 2.5 mm, which would yield a black liquor linear velocity of 1.2 m/sec. The venturi throat had a diameter of 7 mm, implying a linear velocity for the mixture of 2.6 m/sec. The lignin in the black liquor precipitated, flocculated and floated to the surface of the tank. When the tank was full the floating lignin was allowed to stand for 30 mins and then harvested manually with a plastic scoop. The solids content of the lignin sludge varied in repeated experiments from 6-14% lignin w/v. The sludge was placed in a porous fabric bag and allowed to drain overnight. This typically increased the lignin solids content to about 23% w/v. The lignin sludge was then air-dried and sieved to yield a light brown powder containing about 10% moisture.

EXAMPLE 4

Flocculation of an Aqueous Lignin Suspension

The ability of various additives to cause flocculation of lignin in an aqueous suspension of lignin was examined. The results of these studies are provided in Table 2, below.

TABLE 2

| Additive | Concentration | Flocculation of lignin suspension |
|---|---|---|
| Ammonium chloride | 2 mM | − |
|  | 4 mM | − |
|  | 20 mM | ++ |
|  | 40 mM | ++ |
|  | 80 mM | ++ |
|  | 200 mM | ++ |
|  | 400 mM | ++ |
| Nonidet ™ P40 | 0.4 ppm | − |
|  | 1 ppm | − |
|  | 4 ppm | − |
|  | 12 ppm | + |
|  | 37 ppm | ++ |
|  | 111 ppm | ++ |
|  | 333 ppm | ++ |
|  | 1,000 ppm | ++ |
| Ethanol | 1% v/v | − |
|  | 2% v/v | + |
|  | 4% v/v | + |
|  | 9% v/v | ++ |
|  | 12% v/v | ++ |
|  | 17% v/v | ++ |
|  | 29% v/v | ++ |
|  | 38% v/v | + |

TABLE 2-continued

| Additive | Concentration | Flocculation of lignin suspension |
|---|---|---|
| | 44% v/v | * |
| | 50% v/v | * |

++: Flocculation
+: Partial flocculation
−: No flocculation
*: Clear solution (precipitate dissolved)

Ammonium chloride at concentrations between 20 mM and 400 mM caused the lignin suspension to flocculate. Concentrations of greater than 400 mM were not tested. Ammonium sulfate and ammonium bicarbonate were also tested for their ability to cause flocculation of the lignin suspension. Ammonium sulfate gave similar results to ammonium chloride while ammonium bicarbonate had a weak effect at 400 mM and no effect at lower concentrations. Nonidet™ P40 at concentrations between 37 ppm and 1,000 ppm caused the lignin suspension to flocculate, with a weak effect being seen at 12 ppm and no effect at lower concentrations. Concentrations of greater than 1,000 ppm were not tested. Triton™ X-100 and Triton™ X-114 gave similar results to Nonidet™ P40. Sodium deoxycholate showed a weak effect at 1,000 ppm and no effect at lower concentrations. No effect was shown with sodium dodecyl sulfate, Tween™ 20, Tween™ 80, α-methyl mannoside, Brij™ 76, Brij™ 700, Lubrol™ PX or cetyltrimethylammonium bromide (CTAB).

Ethanol at concentrations between 29 and 9% v/v caused the lignin suspension to flocculate. At ethanol concentrations of 4% and 2% there was a weak effect, with no effect being seen at a concentration of 1% v/v. Ethanol at 38% v/v and higher caused the lignin precipitate to dissolve.

EXAMPLE 5

Properties of Lignin Isolated from *Salix* as Determined by NMR

The lignin preparation submitted for NMR analysis was isolated by the treatment of 6.54 g (dry weight) of *Salix schwerinii* 'Kinuyanagi' dry chips with an aqueous solvent comprising 70% ethanol at 190° C. for 100 minutes in the 100 ml digester. The lignin recovered from the black liquor by precipitation and centrifugation was dissolved in DMSO-d6 for nuclear magnetic resonance spectroscopy analysis (as described in Ralph et al., 2006, Journal of Biological chemistry 281(13):8843) and compared to a commercially available Kraft lignin preparation (Sigma-Aldrich #370959). The 2D spectra of the lignin side chains from the NMR analysis for the *Salix* lignin isolated using the methodology described herein is shown in FIG. 5, and the 2D spectra of the lignin side chains from the NMR analysis for a commercial Kraft lignin preparation is shown in FIG. 6.

Figure 5:
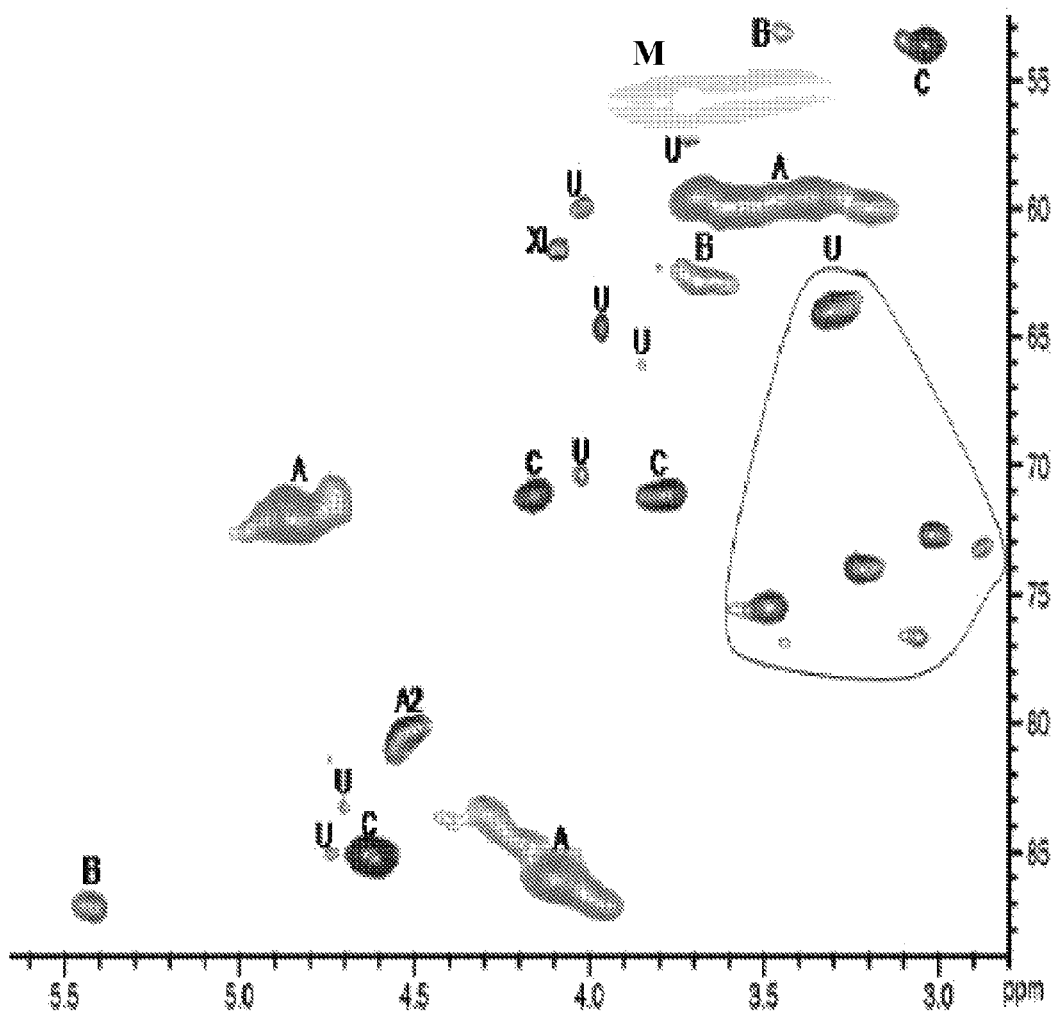
FIG. 5 is the 2D $^{13}C$-$^{1}H$ correlation (HSQC) spectra of lignin side chain regions, acquired during NMR analysis of an isolated lignin sample described herein.

FIG. 5 illustrates the distribution of lignin side chains, including β-aryl ether (identified as "A"), phenylcoumaran (identified as "B"), resinol (identified as "C"), α-ethoxy-β-aryl ether (identified as A2) and cinnamyl alcohol side chains (identified as X1) retained in the lignin isolated using the modified ORGANOSOLV™ process described herein. FIG. 6 illustrates that minute quantities of β-aryl ether (identified as "A") were present in the isolated Kraft lignin preparation, while there were no detectable quantities of phenylcoumaran, resinol, α-ethoxy-β-aryl ether or cinnamyl alcohol side chains. The lignin subunit distribution was quantified via volume-integration of the 2D contours in HSQC spectra, with minor corrections. The high ratio of β-aryl-ether (73%) and resinol (12%) subunits in the high grade isolated lignin preparation described herein is indicative of a higher degree of conservation of native structure. The destruction of the lignin side chains that occurs during Kraft pulping is shown by the absence of signal in the NMR spectra (FIG. 6) indicating the presence of the native lignin side chains in the commercial Kraft lignin sample. These results demonstrate that lignin isolated using the methodology described herein retains a more "natural" structure than commercially available Kraft lignin, with the retention of a large proportion of the side chain structures that are important for lignin reactivity.

The lignin isolated according to methods described herein also demonstrated a higher methoxyl content than the commercially available Kraft lignin (30 to 40% as determined by volume-integration of the 2D contours in HSQC spectra, FIG. 5), making it desirably less likely to re-condense and more amenable toward chemical reaction.

Figure 6:
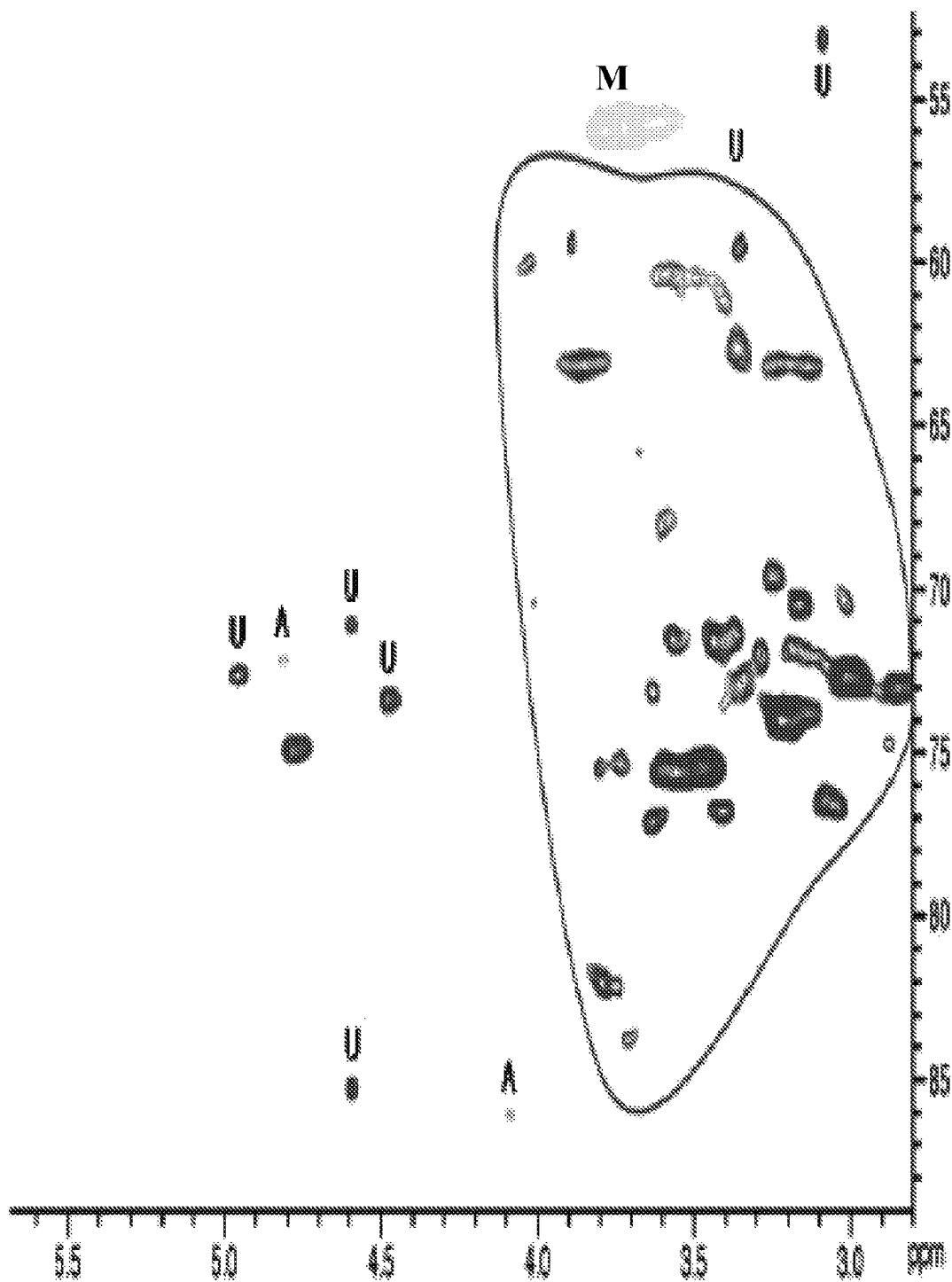
FIG. 6 is the 2D $^{13}C$-$^{1}H$ correlation (HSQC) spectra of side chain region, acquired during NMR analysis of a Kraft lignin (Sigma-Aldrich #370959) sample.

The spectra shown in FIGS. 5 and 6 identify unresolved or unknown (non-lignin) components, such as saccharides, as "U." These unresolved and unassigned constituents are contaminants in a lignin preparation. It is evident from the spectra illustrated in FIGS. 5 and 6 that the commercially available Kraft lignin preparation is highly impure and has a high level of contamination, while the lignin preparation of the present invention has considerably fewer contaminants. In fact, nearly all of the material detected in the commercially available Kraft lignin preparation is contaminant material. While contaminants are present in the lignin preparation of the present invention (FIG. 5), those contaminants represent a far less significant proportion of the preparation.

Additionally, no sugars were detectable when the disclosed isolated lignin preparation was hydrolysed with concentrated sulfuric acid and the supernatant analysed by HPLC (High pressure liquid chromatography) on an ion exclusion column (BioRad Phenomenex Rezex™) with a lower detection limit of 0.2 g of sugars (glucose or xylose) per liter.

Figure 7:
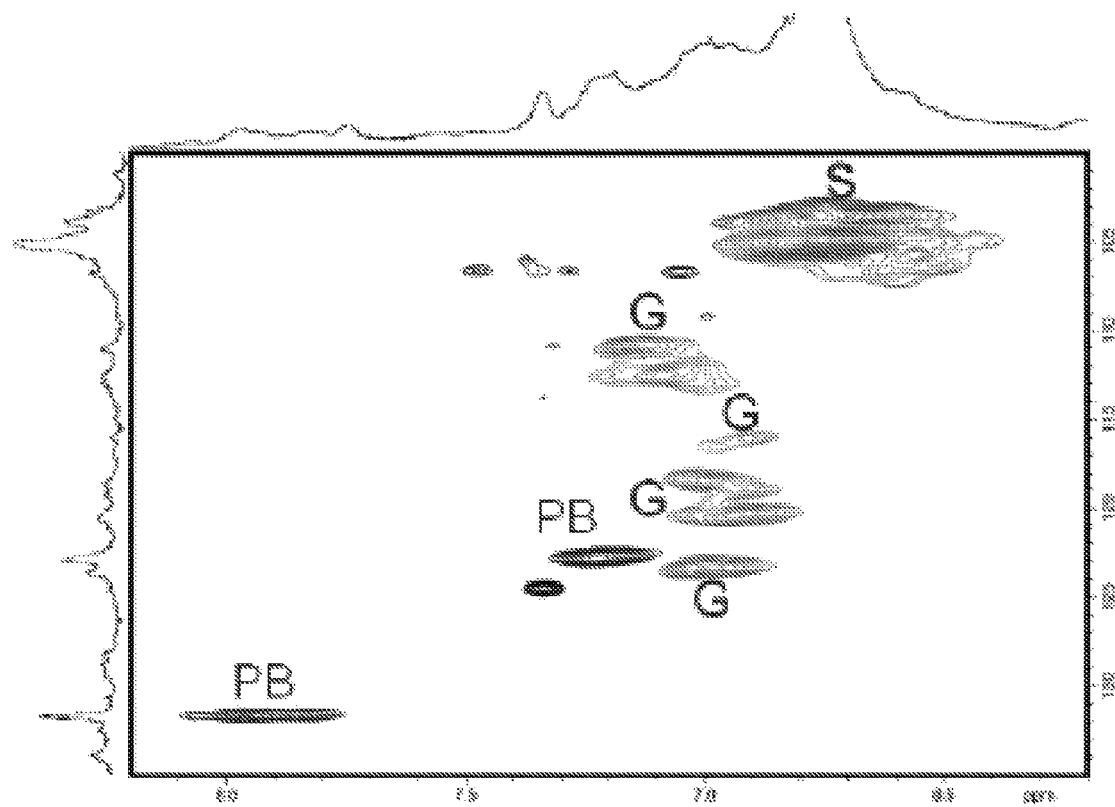
FIG. 7 shows the volume integration of the 2D $^{13}C$-$^{1}H$ correlation (HSQC) spectra of side aromatic units, acquired during NMR analysis of an isolated lignin sample described herein.
Figure 7:
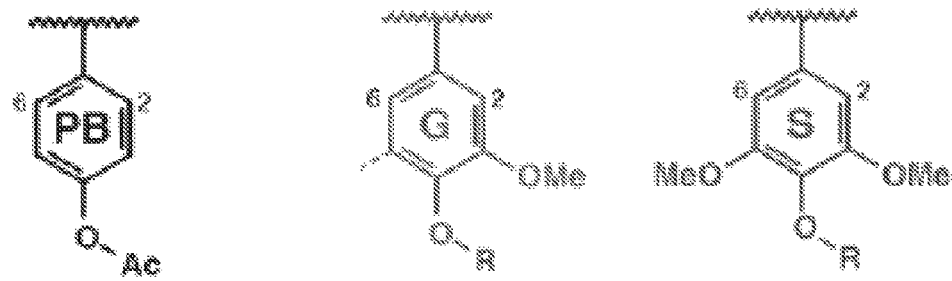

Lignin isolated from *Salix schwerinii* 'Kinuyanagi' using the above process was composed of about 80% syringyl (S) units and a ratio of syringyl:guaiacyl units of about 4:1 as quantified by volume integration of the 2D contours in HSQC spectra (FIG. 7). This high ratio of S lignin is also reflected by the relatively high content of O-methoxyl groups (40%, FIG. 5).

EXAMPLE 6

Additional Properties of Lignin Isolated from *Salix*

Figure 8A:
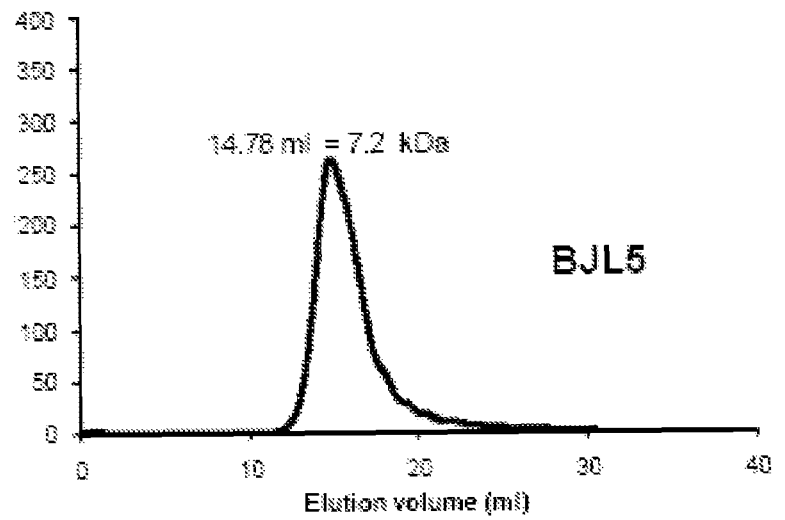
FIG. 8 illustrates gel filtration elution profiles showing the molecular weight distribution of an isolated lignin sample of the present invention in FIG. 8A (BJL5), a commercial Kraft lignin (Sigma-Aldrich #370959) sample in FIG. 8B, and a commercial ORGANOSOLV lignin (Sigma-Aldrich, #37101-7) sample in FIG. 8C.
Figure 8B:
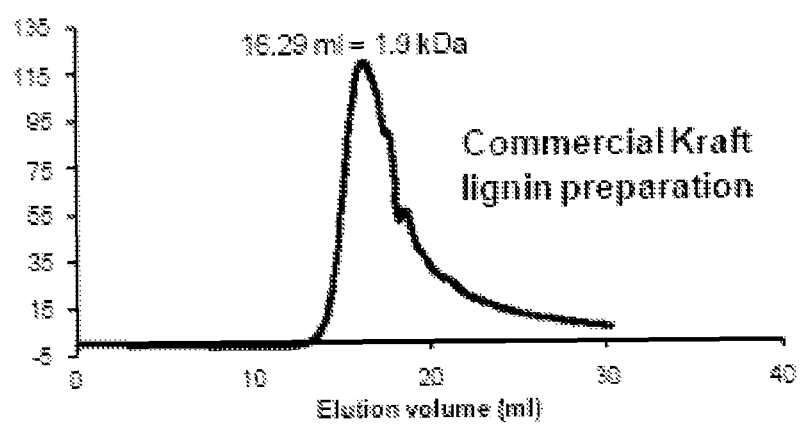
Figure 8C:
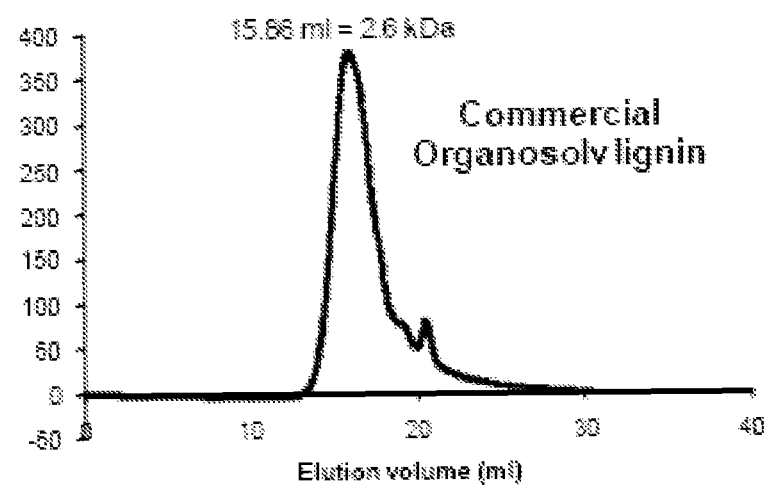

The molecular weight average and molecular weight distribution of several samples of the disclosed high grade isolated lignin were calculated from the gel filtration elution profile of the lignin preparation (FIG. 8) on a Superdex Peptide column (GE Healthcare #17-5176-01 10/300 GL, as described by Reid (1991), Biotechnol. Tech, 5:215-218). Lysozyme, aprotinin and 3,4-dimethylbenzyl alcohol were used as standards for calibration and therefore these molecular weights should be taken as relative values. Isolated lignin samples were prepared as described above using lignin harvested by precipitation and centrifugation (Samples BJL2-5) and lignin harvested using the DAF process described herein (Sample BJLD) were dissolved at 0.5 mg/ml in 50% ethanol/50 mM NaOH for the gel filtration analysis. Commercially available lignin samples were prepared for comparative analysis, including a Kraft lignin preparation (Sigma-Aldrich #370959) and an ORGANOSOLV lignin preparation (Sigma-Aldrich, cat. No. 37, 101-7). Each sample was analysed in duplicate with an injection volume of 200 µl. The results are shown in FIG. 8 and summarized in Table 3, below.

The majority of the lignin (at the elution peak) in the isolated lignin samples prepared as disclosed herein and harvested by precipitation and centrifugation (samples BJL2-5), had an average molecular mass of approximately 6,500 g/mol. This molecular mass is about 2 to 3 times greater than the molecular mass of the majority of the lignin (at the elution peak) in the commercially available Kraft lignin composition (Sigma-Aldrich #370959; molecular mass 1,942 g/mol) or the commercially available ORGANOSOLV lignin composition (Sigma-Aldrich, cat. No. 37, 101-7; molecular mass 2,627 g/mol). The weight average molecular mass of the isolated lignin samples BJL2-5 was in excess of 5,200, while the weight average molecular mass of the commercial Kraft lignin preparation was approximately 2,229 and the weight average molecular mass of the commercial ORGANOSOLV lignin preparation was approximately 3,000. These values are in agreement with previously published studies using gel filtration for molecular weight analysis of Kraft and ORGANOSOLV lignin preparations from hardwood (Kubo and Kadla (2004) Macromolecules, 37:6904-6911; Cetin and Ozmen (2002) *Proceedings of ICNP*; Glasser et al. (1992) *J. Wood Chem. and Technol.* 13:4, 545-559), with slightly higher polydispersity (PD) values. The isolated lignin sample prepared as disclosed herein and harvested using the DAF process described here (Sample BJLD) had an average molecular mass of over 7,200 and a weight average molecular mass of over 5,500.

TABLE 3

| | Molecular Mass | | | |
| --- | --- | --- | --- | --- |
| | g/mol at elution peak (n = 2) | | Weight Average | Polydispersity |
| Lignin Sample | Avr | StDv | (Mw) | (PD) |
| BJL2 | 5,933 | 0.668 | 4,871 | 4.1 |
| BJL3 | 6,374 | 0.844 | 5,384 | 3.0 |
| BJL4 | 6,800 | 0.810 | 5,372 | 3.9 |
| BJL5 | 7,172 | 0.285 | 5,450 | 3.9 |
| BJL Average | 6,570 | 0.535 | 5,269 | 3.7 |
| BJLD | 7,271 | 0.049 | 5,712 | 3.7 |
| Kraft | 1,942 | 0.218 | 2,229 | 3.5 |
| ORGANOSOLV | 2,627 | 0.070 | 2,992 | 3.3 |

EXAMPLE 7

Reactivity of High Grade Lignin Isolated from *Salix*

The reactivity of the disclosed lignin was assessed by measurement of the total and phenolic hydroxyl groups and compared with the commercial Kraft and ORGANOSOLV lignin preparations (Table 4, below). The total amount of hydroxyl functional group in each lignin sample is expressed as a potassium hydroxide equivalent and was measured using standard testing method (ASTM D4274-05). The amount of phenolic hydroxyl groups in each lignin sample was assessed by differential spectrophotometry as described by Wexler (Analytical Chemistry 36(1) 213-221 (1964)) using 4-hydroxy-3-methoxybenzyl alcohol as a calibration standard. In this analysis, the amount of phenolic hydroxyl is relatively low for all the lignin samples analysis and the total amount of hydroxyl measurements do not vary greatly among the samples (Table 5). However, the ratio of phenolic to total hydroxyl is lower in the disclosed lignin samples (BJL2, BJL-5 and BJLD) as compared with the Kraft and ORGANOSOLV commercial lignin preparations.

TABLE 4

| | Hydroxyl Numbers | | |
| --- | --- | --- | --- |
| | mmol/g | | Ratio |
| Lignin Sample | Total | Phenolic | Phenolic:Total |
| BJL2 | 6.06 | 0.33 | 0.054 |
| BJL5 | 6.23 | 0.28 | 0.044 |
| BJLD | 5.40 | 0.29 | 0.054 |
| ORGANOSOLV | 5.78 | 0.38 | 0.066 |
| Kraft | 6.41 | 0.40 | 0.062 |

EXAMPLE 8

Production of Urethane Foam Using Isolated Lignin of the Present Invention

Rigid polyurethane (PU) foam was produced using lignin derived from *Salix* and isolated as described herein. The foam was tested and demonstrated excellent thermal conductivity and density properties. The density of the rigid PU foam produced using isolated lignin was 0.62 g/cm$^3$ compared to a density of rigid PU foam produced using conventional feedstocks of 0.05 g/cm$^3$. The thermal conductivity of the rigid PU foam produced using isolated lignin was 0.030 to 0.032 compared to a thermal conductivity of rigid PU foam produced using conventional feedstocks of 0.035. The thermal degradation temperature of the rigid PU foam produced using isolated lignin was 295° C.; the compression strength was 0.5 MPa; and the compression modulus was 19 MPa.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, method, method step or steps, for use in practicing the present invention. All such modifications are intended to be within the scope of the claims appended hereto.

To the extent that the claims appended hereto express inventions in language different from that used in other portions of the specification, applicants expressly intend for the claims appended hereto to form part of the specification and the written description of the invention, and for the inventions, as expressed in the claims appended hereto, to form a part of this disclosure.

All of the publications, patent applications and patents cited in this application are herein incorporated by reference in their entirety to the same extent as if each individual publication, patent application or patent was specifically and individually indicated to be incorporated by reference in its entirety.

We claim:

1. A method for isolating a lignin preparation from a plant material comprising:
   (a) contacting the plant material with an aqueous ethanol solution at an elevated temperature and an elevated pressure for a retention time sufficient to produce a liquid solvent mixture comprising ethanol, ethanol-soluble lignin and water, and a plant pulp material;
   (b) separating the plant pulp material from the liquid solvent mixture;

(c) precipitating the ethanol-soluble lignin and forming lignin particulates by diluting the liquid solvent mixture with an aqueous gasified solution containing dissolved gas under conditions that promote the formation of gas bubbles, whereby the gas bubbles attach to precipitated lignin particulates as they form, and the precipitated lignin particulates are transported to the liquid surface by attachment to the gas bubbles;

(d) harvesting the precipitated lignin from the liquid surface; and (e) recovering an isolated lignin preparation from the precipitated lignin.

2. The method of claim 1, additionally comprising removing ethanol from the liquid solvent mixture to produce an ethanol depleted solvent mixture prior to diluting the liquid solvent mixture with the aqueous gasified solution.

3. The method of claim 1, wherein the plant material is a lignocellulosic material selected from the group consisting of: woody or herbaceous materials, agricultural or forestry residues, and dedicated energy crops.

4. The method of claim 3, wherein the lignocellulosic material is a coppicable hardwood.

5. The method of claim 4, wherein the plant material comprises material from a *Salix* species.

6. A method for harvesting lignin from a solvent mixture comprising solubilized lignin, the method comprising:

(a) diluting the solvent mixture comprising solubilized lignin with an aqueous gasified solution containing dissolved gas under conditions that promote the formation of gas bubbles, whereby the solubilized lignin precipitates and the gas bubbles attach to precipitated lignin as the precipitated lignin forms, and the precipitated lignin is transported to the liquid surface by attachment to the gas bubbles;

(b) harvesting the precipitated lignin from the liquid surface; and (c) recovering an isolated lignin preparation from the precipitated lignin.

7. The method of claim 1, wherein the isolated lignin preparation has a weight average molecular mass (Mw) of at least about 4,000.

8. The method of claim 1, wherein the isolated lignin preparation has a weight average molecular mass (Mw) of at least about 4,500.

9. The method of claim 1, wherein the isolated lignin preparation has a weight average molecular mass (Mw) of at least about 5,000.

10. The method of claim 1, wherein the isolated lignin preparation has a ratio of syringyl (S) units to guaiacyl (G) units of at least about 1:1.

11. The method of claim 1, wherein the isolated lignin preparation has a ratio of syringyl (S) units to guaiacyl (G) units of at least about 3:1.

12. The method of claim 1, wherein the isolated lignin preparation comprises less than about 1.0% sugars.

13. The method of claim 1, wherein the isolated lignin preparation comprises a high ratio of β-aryl-ether (>50%) and resinol (>8%) subunits.

14. The method of claim 1, wherein step (a) is carried out substantially in the absence of an introduced acid or alkaline catalyst.

15. The method of claim 1, wherein the aqueous gasified solution is supersaturated.

16. The method of claim 1, wherein the dissolved gas in the aqueous gasified solution comprises $CO_2$, nitrogen, air or a gas mixture.

17. The method of claim 1, comprising diluting the liquid solvent mixture using a volume ratio of from about 2 to 10 times aqueous gasified solution to liquid solvent mixture.

18. The method of claim 1, additionally comprising flash cooling the liquid solvent mixture prior to introduction of the aqueous gasified solution.

19. The method of claim 1, additionally comprising filtering the liquid solvent mixture prior to introduction of the aqueous gasified solution.

20. The method of claim 1, additionally comprising mixing the liquid solvent mixture with the aqueous gasified solution under conditions of high fluid shear.

* * * * *